United States Patent
Lampert et al.

(10) Patent No.: US 7,266,560 B2
(45) Date of Patent: Sep. 4, 2007

(54) PARCELIZED GEOGRAPHIC DATA MEDIUM WITH INTERNAL SPATIAL INDICES AND METHOD AND SYSTEM FOR USE AND FORMATION THEREOF

(75) Inventors: David S. Lampert, Highland park, IL (US); Richard A. Ashby, Blue River, WI (US); Robert Fernekes, Wood Dale, IL (US); James A. Meek, Palatine, IL (US); John Jaugilas, Lombard, IL (US)

(73) Assignee: Navteq North America, LLC, Chicago, IL (US)

( * ) Notice: Subject to any disclaimer, the term of this patent is extended or adjusted under 35 U.S.C. 154(b) by 609 days.

(21) Appl. No.: 09/016,002

(22) Filed: Jan. 30, 1998

(65) Prior Publication Data

US 2004/0205517 A1 Oct. 14, 2004

(51) Int. Cl.
*G06F 17/30* (2006.01)
*G01C 21/00* (2006.01)
*G01C 21/30* (2006.01)
*G08G 1/23* (2006.01)

(52) U.S. Cl. .................. 707/101; 707/101; 701/200; 701/209; 340/990

(58) Field of Classification Search ................. 707/104, 707/200, 101, 104.1; 340/390, 395, 990, 340/991, 995; 701/200, 209
See application file for complete search history.

(56) References Cited

U.S. PATENT DOCUMENTS 4,969,114 A * 11/1990 Herring et al. ............... 703/2

(Continued)

FOREIGN PATENT DOCUMENTS

| EP | 0330787 A2 * | 12/1988 |
| EP | 837341 A1 * | 4/1998 |
| JP | 410043946 A * | 1/1998 |

OTHER PUBLICATIONS

Kitsuregawa, Masaru; Harada, Lilian; Takagi, Mikio; "Join Strategies on KD–Tree Indexed Relations"; IEEE, Feb. 1989; pp. 85–93.*

(Continued)

*Primary Examiner*—Ella Colbert
(74) *Attorney, Agent, or Firm*—Frank J. Kozak; Jon D. Shutter; Grace L. O'Brien

(57) ABSTRACT

A navigable map database, stored on a computer-readable medium and used with a navigation application program, includes data which are spatially parcelized into a plurality of parcels. Associated with each of the plurality of parcels is a first index which associates the area represented by the data in the parcel with a plurality of sub-areas formed of the area. Also associated with each of the parcels is a second index associating each of the data in the parcel with at least one of the sub-areas. Further disclosed is a method for producing a navigable map database which is parcelized into a plurality of parcels, wherein each of the plurality of parcels includes a first index which associates the area represented by the data in the parcel with a plurality of sub-areas formed of the area and a second index associating each of the data in the parcel with at least one of the sub-areas. Also further disclosed are a program and method for finding data in one or more parcels that match a spatial search criterion using a navigable map database that is parcelized into a plurality of parcels, wherein each of the plurality of parcels includes a first index which associates the area represented by the data in the parcel with a plurality of sub-areas formed of the area and a second index associating each of the data in the parcel with at least one of the sub-areas. The program and method use the first and second indices to identify which of the data in at least one of the plurality of parcels satisfy the spatial search criterion.

21 Claims, 10 Drawing Sheets

U.S. PATENT DOCUMENTS

| | | | | |
|---|---|---|---|---|
| 5,543,789 A | * | 8/1996 | Behr et al. | 340/995 |
| 6,078,864 A | * | 8/1996 | Long et al. | 701/209 |
| 5,565,874 A | * | 10/1996 | Rode | 342/457 |
| 5,694,534 A | * | 12/1997 | White et al. | 345/440 |
| 5,731,978 A | * | 3/1998 | Tamai et al. | 701/201 |
| 5,754,846 A | * | 5/1998 | Janse et al. | 707/100 |
| 5,808,566 A | * | 9/1998 | Behr et al. | 340/995 |
| 5,893,113 A | * | 4/1999 | McGrath et al. | 707/200 |
| 5,951,620 A | * | 9/1999 | Ahrens et al. | 701/200 |
| 5,953,722 A | | 9/1999 | Lampert et al. | 707/100 |
| 5,968,109 A | | 10/1999 | Israni et al. | 701/208 |
| 5,987,306 A | * | 11/1999 | Nilsen et al. | 455/67.11 |
| 5,995,970 A | * | 11/1999 | Robinson et al. | 707/101 |
| 6,047,234 A | * | 4/2000 | Cherveny et al. | 701/200 |
| 6,058,390 A | | 5/2000 | Liaw et al. | 707/2 |
| 6,282,489 B1 | * | 8/2001 | Bellesfield et al. | 701/201 |

OTHER PUBLICATIONS

IBM Technical Disclosure Bullentin; "Hierarchical Data Model for a Relational Database based Geographic Information System"; Mar. 1997; vol. 40; Issue No. 3; pp. 107–116.*

Sweeney, Lawrence D., Ph.D.: "Comparative benefits of various automotive navigation a routing technologies " (pp. 415–421), Position Location and Navgitation Symposium, Apr. 22–26, 1996, Menlo Park, CA, ISBN: 0–7803–3085–4.

Rand McNally Easy–to–Read Travel Atlas, United States, Canada, Mexico, 2000 Millennium Atlas, pp. i, 1, 14, 24 and 32; Copyright 2000.

* cited by examiner

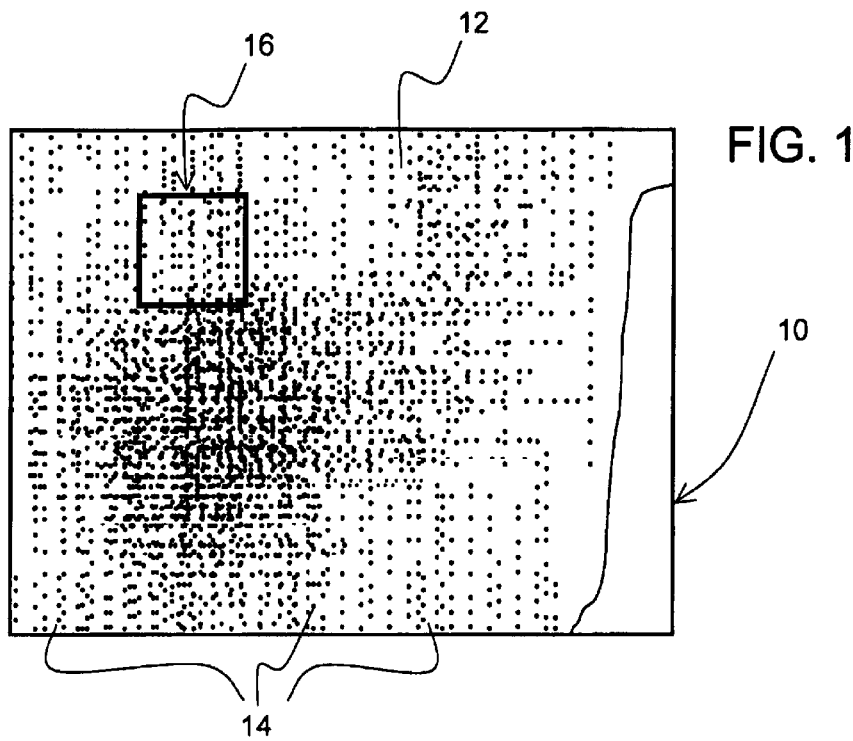
FIG. 1
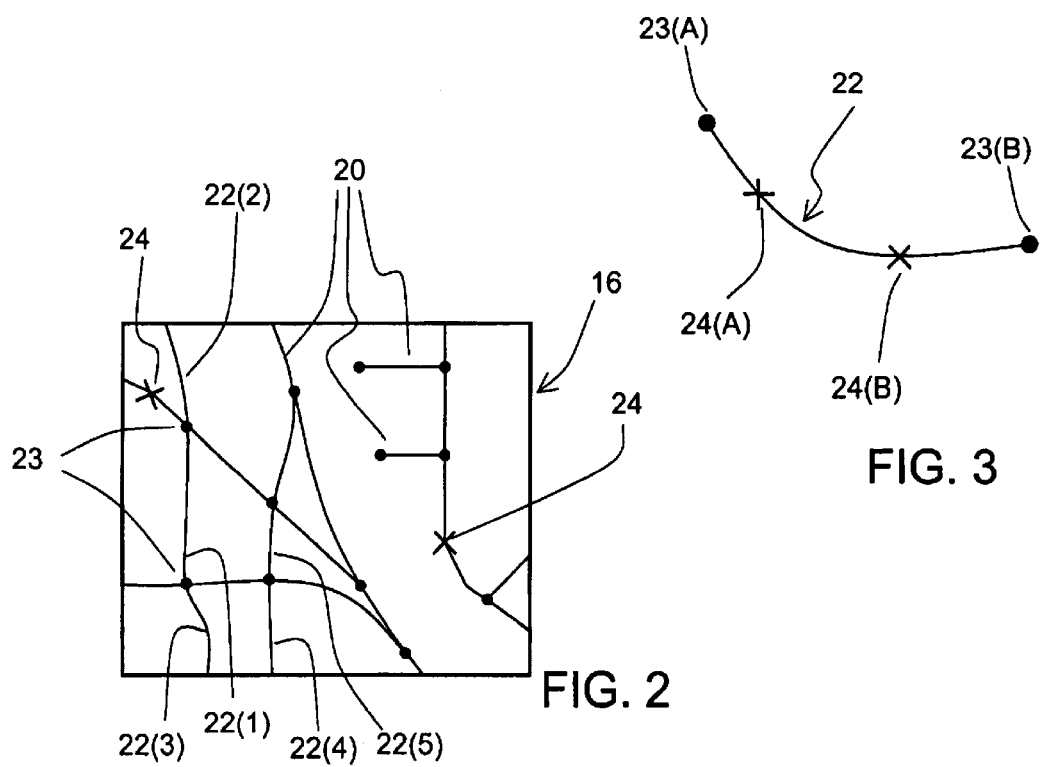
FIG. 2
FIG. 3

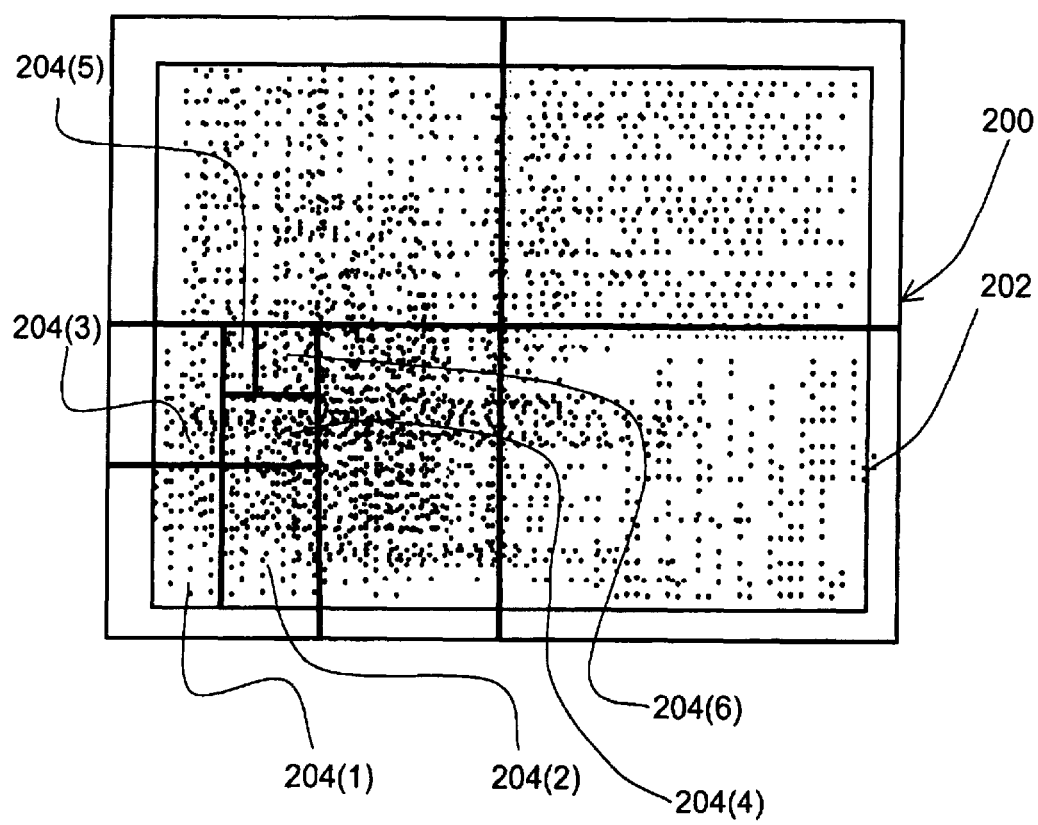

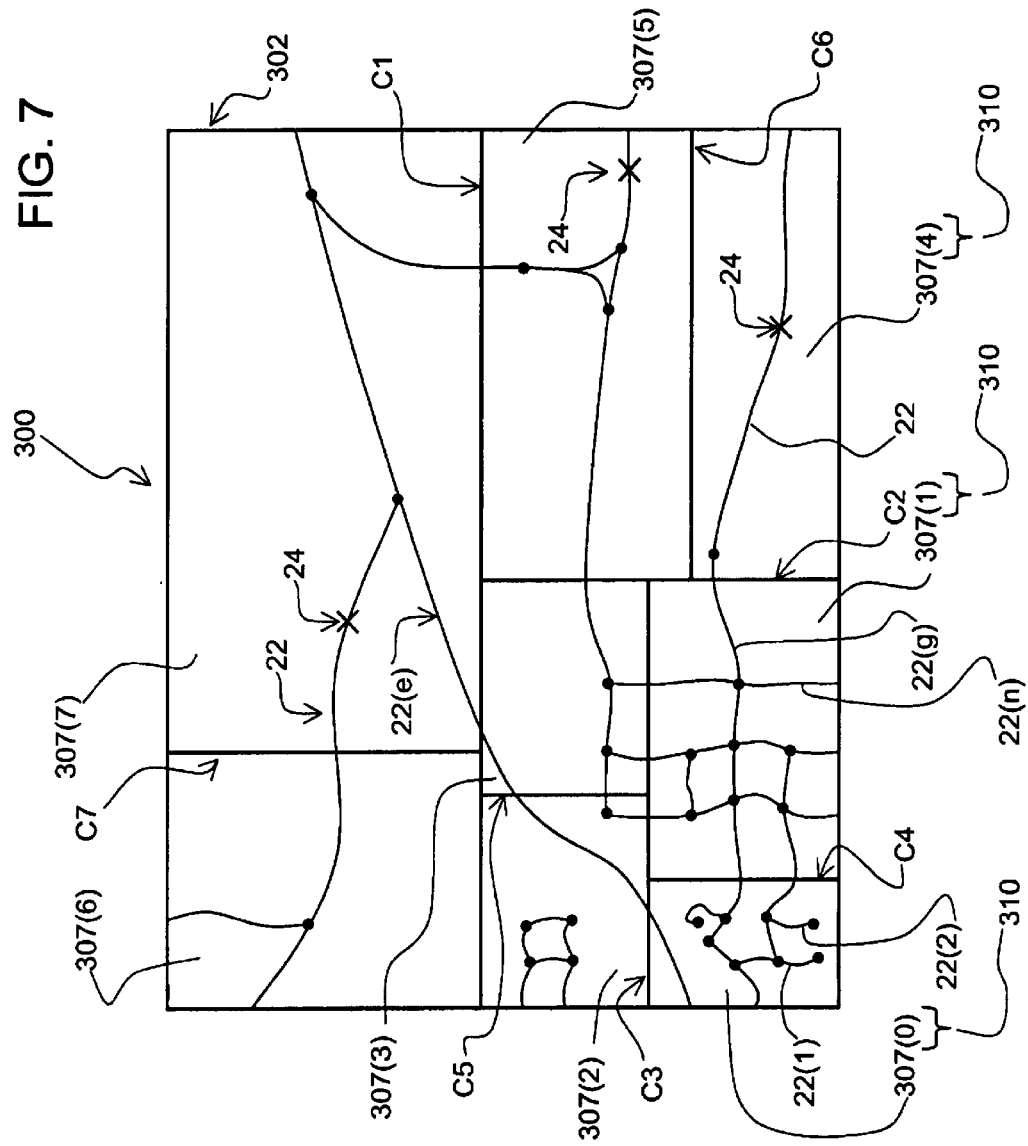

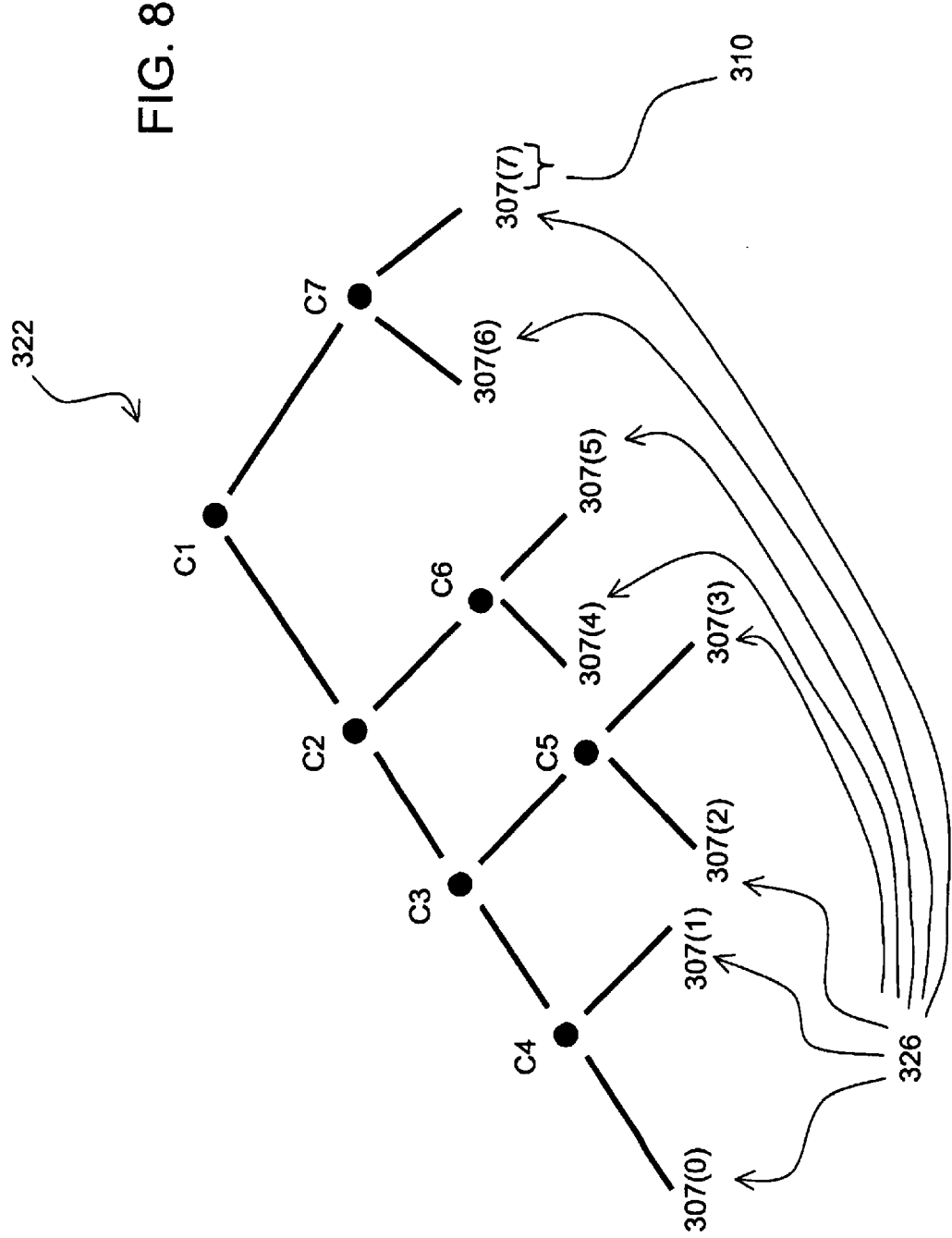

320

| SEGS | SUB-RECTANGLE INDEX | | | | | | | |
|---|---|---|---|---|---|---|---|---|
| | (0) | (1) | (2) | (3) | (4) | (5) | (6) | (7) |
| seg(1) | 1 | 0 | 0 | 0 | 0 | 0 | 0 | 0 |
| seg(2) | 1 | 0 | 0 | 0 | 0 | 0 | 0 | 0 |
| - - - | | | | | | | | |
| - - - | | | | | | | | |
| seg(e) | 1 | 0 | 1 | 1 | 0 | 0 | 0 | 1 |
| seg(g) | 0 | 1 | 0 | 0 | 1 | 0 | 0 | 0 |
| - - - | | | | | | | | |
| seg(n) | 0 | 1 | 0 | 0 | 0 | 0 | 0 | 0 |
| - - - | | | | | | | | |
| - - - | | | | | | | | |
| - - - | | | | | | | | |

FIG. 10

PARCELIZED GEOGRAPHIC DATA MEDIUM WITH INTERNAL SPATIAL INDICES AND METHOD AND SYSTEM FOR USE AND FORMATION THEREOF

BACKGROUND OF THE INVENTION

The present invention relates to system and method for facilitating access to and use of geographic data used with a navigation application program that provides navigating features and functions to an end user, and more particularly, the present invention relates to a geographic data medium wherein the data are organized into parcels and a method and system for the organization, storage, retrieval and use of the geographic data that facilitates the use thereof for various navigating functions provided by a navigation application program.

Computer-based navigation application programs are available that provide users with various navigating functions and features. For example, some navigation application programs are able to determine an optimum route to travel by roads between locations. Using input from a user, and optionally from equipment that can determine one's physical location (such as a GPS system), a navigation application program can examine various routes between two locations to determine an optimum route to travel from a starting location to a destination location in a geographic region. The navigation application program may then provide the user with information about the optimum route in the form of instructions that identify the maneuvers required to be taken by the user to travel from the starting location to the destination location. If the navigation system is located in an automobile, the instructions may take the form of audio instructions that are provided along the way as the user is traveling the route. Some navigation application programs are able to show detailed maps on computer displays outlining routes to destinations, the types of maneuvers to be taken at various locations along the routes, locations of certain types of features, and so on.

In order to provide these and other navigating functions, the navigation application program requires one or more detailed databases that include data which represent physical features in a geographic region. The detailed database may include data representing the roads and intersections in a geographic region and also may include information about the roads and intersections in a geographic region, such as turn restrictions at intersections, speed limits along the roads, the locations of stop signs, street names of the various roads, address ranges along the various roads, and so on.

One difficulty in providing geographic data for use by a navigation application program relates to the efficient utilization of the available computer resources of the navigation system on which the navigation application program is run. Computer-based navigation application programs are provided on various platforms including some with relatively limited computer hardware resources. For example, navigation systems may be located in vehicles or may be hand-held. These types of navigation systems typically have relatively limited computer resources, such as limited memory and relatively slow I/O. In order to provide a high a level of functionality in such systems, it is required that the available computer resources be used efficiently.

Given the relatively large size of the geographic database necessary to provide a desired level of navigating functionality to the user, it is accepted that all the data records for an entire geographic region cannot be loaded into the memory of the navigation system at the same time. This is especially true for navigation system platforms with limited resources, such as systems installed in vehicles or hand-held systems. Due to the limited memory resources of these navigation systems, it is necessary to load geographic data as needed from a storage medium, such as a CD-ROM, into the memory of the navigation system for use by the navigation application program. Unfortunately, as mentioned above, in these types of systems, I/O access from a storage medium is also likely to be relatively slow. Thus, the relatively limited memory resources combined with the relatively slow I/O can limit the performance of some types of navigation systems, resulting in slow response. Aside from being undesirable, slow response in a navigation system may render the system useless for its intended purpose in certain circumstances. For example, if the navigation system is installed in a vehicle, the driver may require information from the navigation system about a desired route in a matter of seconds in order to utilize the information while driving. If the navigation system requires more than several seconds to calculate a route, the driver may have moved beyond the point at which the routing information provided by the navigation system is relevant. Therefore, it is important that navigation systems operate efficiently in order to provide navigating information relatively quickly.

Navigation application programs may also be run on computer platforms that have in general greater memory resources and faster I/O, such as personal computers or on networks. Although these systems may have more and faster resources, the considerations related to the efficient use of geographic data still apply, but on a larger scale. With these types of systems, even greater functionality can be provided if the limitations imposed by memory size and I/O are minimized.

Techniques have been devised or implemented to improve navigation system performance by organizing, structuring, or arranging the geographic database or the data in the database in particular ways. Because a navigation system uses geographic data in certain known and expected ways to perform known functions, the geographic data can be organized, structured, or arranged in a manner that facilitates their use in these known ways by the navigation system. Included among the techniques that can be used to facilitate the use of geographic data by navigation systems is parcelization. When data are parcelized, the plurality of data records that together comprise the geographic data are grouped together into separate groups or parcels. Another way that geographic data can be organized to facilitate their use is to organize the data spatially. When geographic data are organized spatially, features that are close together physically in the geographic region are represented by data records that are physically (or logically) close together in the database. Geographic data can be both parcelized and spatial organized to take advantage both of these techniques.

Although techniques such as parcelization and spatial organization can enhance the use of geographic data by a navigation system, use of these techniques may be accompanied by some drawbacks. For example, spatial searches for geographic data that do not coincide with parcel boundaries may require examination of unnecessary data records. Accordingly, there continues to be a need for improvement in the making and using of geographic databases in order to provide better performance in navigation systems.

Accordingly, it is an objective to provide improvements in the storage or use of geographic data that improves performance in a navigation system.

SUMMARY OF THE INVENTION

To address the above concerns, the present invention provides a navigable map database, stored on a computer-readable medium and used with a navigation application program, wherein the navigable map database includes data which are spatially parcelized into a plurality of parcels. Associated with each of the plurality of parcels is a first index that associates the area represented by the data in the parcel with a plurality of sub-areas formed of the area. Also associated with each of the parcels is a second index that associates each of the data in the parcel with at least one of the sub-areas.

According to a further aspect of the invention, there is provided a method for producing a navigable map database which is parcelized into a plurality of parcels, wherein each of the plurality of parcels includes a first index that associates the area represented by the data in the parcel with a plurality of sub-areas formed of the area and a second index that associates each of the data in the parcel with at least one of the sub-areas.

According to another aspect of the invention, there is provided a program and method for finding data in one or more parcels that matches a spatial search criterion using a navigable map database that is parcelized into a plurality of parcels, wherein each of the plurality of parcels includes a first index that associates the area represented by the data in the parcel with a plurality of sub-areas formed of the area and a second index that associates each of the data in the parcel with at least one, of the sub-areas. The program and method use the first and second indices to identify which of the data in at least one of the plurality of parcels satisfy the spatial search criterion.

BRIEF DESCRIPTION OF THE DRAWINGS

FIG. 1 illustrates a map showing a geographic region.

FIG. 2 shows an expanded view of a portion of the map of FIG. 1.

FIG. 3 is an illustration of a single road segment shown in the map of FIG. 2.

FIG. 6 shows the map of a geographic region illustrating application of a parcelization method to geographic data.

FIG. 7 shows a map of a portion of a geographic area with divisions into sub-rectangles illustrating application of an embodiment that organizes geographic data within a parcel.

FIG. 8 graphically illustrates a kd-tree structure used to represent the separation of geographic data within a parcel using the divisions shown in FIG. 7.

FIG. 10 is a representation of an index structure used in connection with the organization illustrated in FIGS. 7–9.

DETAILED DESCRIPTION OF THE PRESENTLY PREFERRED EMBODIMENTS

I. Overview of Navigable Map Database

Figure 5:
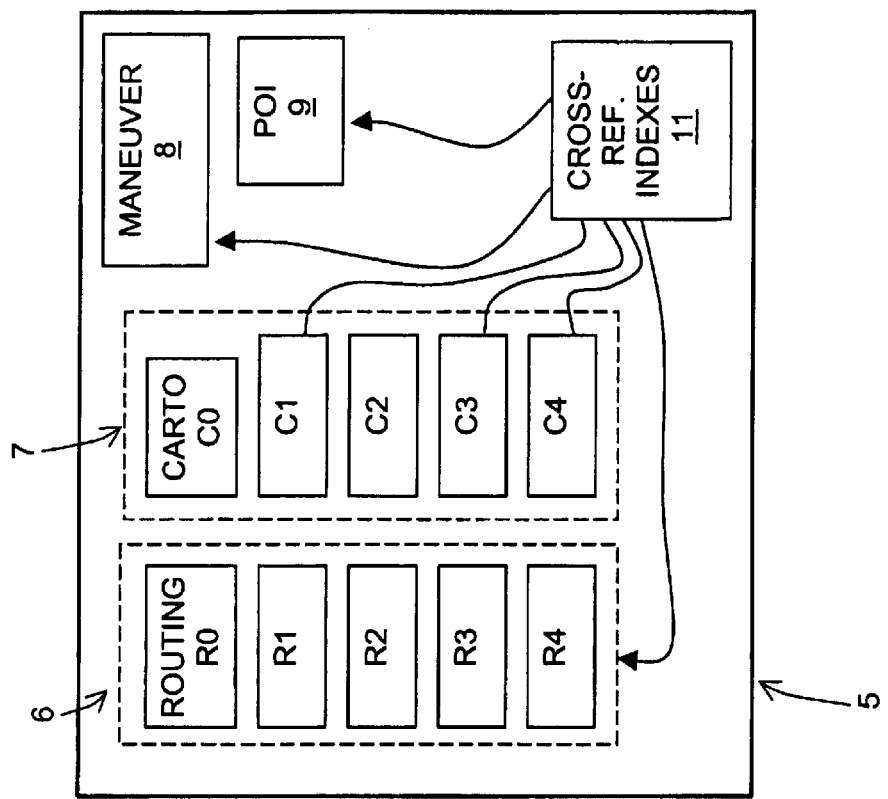
FIG. 5 is a diagram similar to FIG. 4 illustrating both separate subsets of data types and separate layers of data in some of the types.

In one present embodiment, the speed and/or functionality of a navigation system can be enhanced by a combination that includes improvements in the storage, arrangement, and/or structuring of the geographic data used by the system to facilitate the use of the data by some of the functions in the navigation application program in the systems that use the data. Based upon the manner in which the geographic data are stored, arranged, and/or structured, functions in the navigation application program that access the data can implement routines that exploit the improvements incorporated into the geographic data. This combination can result in overall improved performance by the navigation system.

FIG. 1 illustrates a map 10 showing a geographic region 12 and FIG. 2 shows an expanded view of a portion 16 of the map 10. The portion 16 in FIG. 2 illustrates part of the road network 20 in the geographic region 12. The road network 20 includes, among other things, roads and intersections located in the geographic region 12. As shown in FIG. 2 in the illustrated portion 16 of the map 10, each road in the geographic region 12 is composed of one or more segments, 22(1), 22(2) . . . 22(n). In one embodiment, a road segment represents a portion of the road. In FIG. 2, each road segment 22 is shown to have associated with it two nodes 23: one node represents the point at one end of the road segment and the other node represents the point at the other end of the road segment. A single road segment 20 and its two associated nodes 23(A) and 23(B) are illustrated in FIG. 3. The node at either end of a road segment may correspond to a location at which the road meets another road, e.g. an intersection, or where the road dead ends. (An intersection may not necessarily be a place at which a turn from one road to another is permitted, but represents a location at which one road and another road have the same latitude and longitude.)

In addition, if the road segment 22 is other than straight (e.g., it bends, turns, etc.), the road segment 22 may include one or more shape points 24 between its end points 23. Shape points 24 provide geographic positions (i.e., latitudes, longitudes) along the length of the road segment to accurately represent the true physical locations of the road segment along its length. Shape points 24 are used to assist in vehicle positioning, map display, etc.

In one type of geographic database, there is at least one database entry (also referred to as "entity" or "record") for each road segment in a geographic region. This road segment data record may have associated with it information (such as "attributes", "fields", etc.) that allows identification of the nodes associated with the road segment and/or the geographic positions (e.g. the latitude and longitude coordinates) of the two nodes. In addition, the database road segment record may have associated with it information (e.g. more "attributes", "fields", etc.), that specify the speed of travel on the portion of the roadway represented by the road segment record, the direction of travel permitted on the road portion represented by the road segment record, the name of the road represented by the road segment record, what if any turn restrictions exist at each of the nodes which correspond to intersections at the ends of the road portion represented by the road segment record, street address ranges of the roadway represented by the road segment record, and so on.

As described above, each segment data entity that represents an other-than-straight road segment may include one or more shape points 24. The shape points 24 are represented by shape point data attributes that are associated with their respective data segment entity. In collecting geographic data for use in navigation systems, shape points are determined for segments of roads that bend or curve so that the position of points along the road segment can be accurately determined.

Several navigation application functions require identification of a road segment data record based upon the physical location of the portion of the road in the geographic region which is represented by the road segment data record. Therefore, the geographical position of the portion of the road represented by the road segment data record is associated with the database entity for the road segment data record. In one embodiment, the location of the road segment is identified by the positions of its nodes. By convention or design, one of the two nodes associated with the road segment may be used to identity the location of the road segment, although both nodes or some other arrangement may be employed. The road segment data record may have associated with it attribute information that allows identification of its nodes.

In a geographic database that represents the region 12, there may also be a database entry (entity or record) for each node in the geographic region. The node data record may have associated with it information (such as "attributes", "fields", etc.) that allows identification of the road segment(s) that connect to it and/or its geographic position (e.g. the latitude and longitude coordinate).

Referring again to the map of FIG. 1, a plurality of locations 14 are shown to be located in the geographic region 12. Each of the locations 14 represents a place or point in the geographic area 12 at which there is located a feature about which it is desired to include information in a geographic database. Each of these locations 14 has a unique physical location (latitude, longitude, and optionally absolute or relative altitude) and each of the locations 14 can be uniquely identified by its two dimensional (or three dimensional) geographic coordinates, (i.e., latitude, longitude, and optionally altitude). A location 14 may correspond to one of the nodes located at the end of road segment data entity, or may correspond to a point-of-interest, such as a hotel or civic center, or may correspond to a point along a road segment at which the direction of the road changes. The locations 14 may represent anything physically located in the geographic area 12.

II. Separate Subsets of Geographic Data

One way that the accessing of geographic data can be enhanced for performing various navigation functions is to provide separate collections or subsets of the geographic data for use by each of the separate functions in the navigation application program. Each of these separate subsets is tailored specifically for use by one of the functions. For instance, the route calculation function normally uses only a portion of all the information in the geographic database that is associated with a segment of a road. For example, when the route calculation function is being run, it may require information such as the speed along a road segment, turn restrictions from one road segment to another, and so on. However, the route calculation function does not normally require the name of the road to calculate an optimum route. Similarly, when using the map display function, some of the information associated with a road segment, such as the speed limits or turn restrictions, is not required. Instead, when the map display function is run, it uses only a portion of the information associated with the road segment, such as the shapes and locations of roads, and possibly the names of the roads. Even further, when the maneuver function is being run, some of the information associated with a segment of a road, such as the speed and turn restrictions, is not required. Instead, when the maneuver function is being run, it uses information that includes the name of the road represented by the road segment, the address range along the road segment, any signs along the road segment, and so on. Although there may be some overlap as to the types of information used by the various navigation functions, some of the data used by any one of these navigation functions is not used by another of the functions. If all the information relating to each road segment were associated with it as a single data entry in a single database, each data entity record would be relatively large. Thus, whenever any one of the navigation functions accessed an entity record, it would have to read into memory a significant amount of information much of which would not be needed by the navigation function. Moreover, when reading the data entity from disk, relatively few data entities could be read at a time since each data entity would be relatively large.

Figure 4:
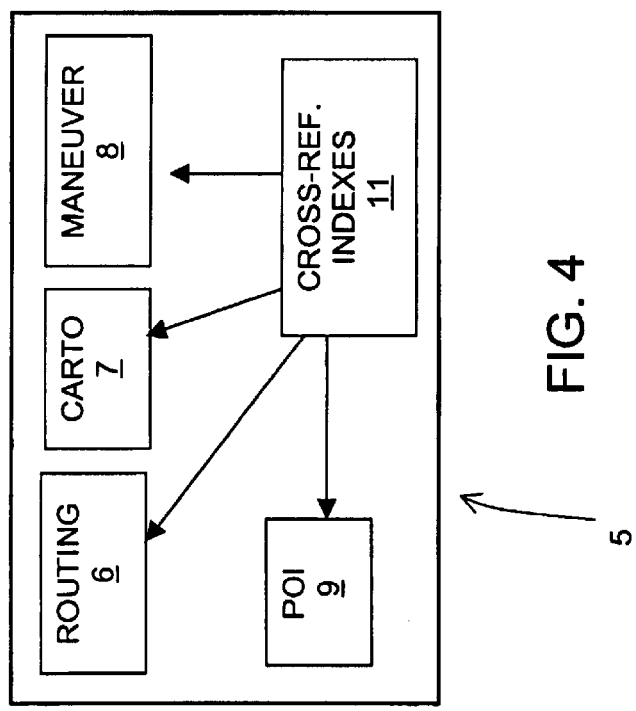
FIG. 4 is a diagram illustrating a geographic database for the geographic region illustrated in FIG. 1 and having separate subsets of data for use with navigation application programs.

In order to provide the information in the geographic database in a format more efficient for use by each of the navigation functions, separate subsets of the entire geographic database for a given geographic region are provided for each of the different types of navigation functions to be provided in the navigation application program. FIG. 4 illustrates a geographic database 5 comprised of separate routing data 6, cartographic data 7 (for map display), maneuver data 8, and points-of-interest data 9. A geographic database may be defined with fewer or more subsets than these, and other types of data may be defined and included.

Each subset of data includes only the data required to be used by a particular navigation function. There is some overlap of data between each of these subsets, with the result that some parts of the information may be included in more than one subset. For example, both the road segment data entity in the routing data subset as well as the road segment data entity in the cartographic data subset may include attributes identifying the nodes located at the ends of the segments. Although this duplication may result in an larger overall data storage requirement, each of the navigation programs benefits from the resultant efficiency of handling smaller amounts of data.

Providing for separate subsets of geographic data for each of the navigation programs also takes into account that usage of each of these navigation functions relates to the others of the navigating functions in expected ways. For example, a user will often first want to view a present position, then enter a destination, then receive instructions how to start toward the destination, then observe a map showing the initial portion of the route, then receive further instructions, then have a map displayed of the next portion of the route, and so on. Because of these type of expected usages, dividing the data into subsets provides for efficient use of the data when using each separate function.

Although the division of the geographic data into subsets provides for efficient use of the data by each of the different navigation functions, it becomes necessary to provide that the different navigating functions that use these different subsets of the database work together. For example, in the example mentioned above, after a user obtains a calculated route, it may be desired to display a map on a computer display with the calculated route highlighted. In order to accomplish this, the routing subset of geographic data is accessed first to obtain the routing road segment data entities for the optimum route, and then the cartographic subset of the geographic database is accessed to obtain the cartographic road segment data entities corresponding to the routing data entities. To permit these data subsets to work together, index files 11 may be included that provide cross references, search trees, or other data finding techniques.

III. Layering of Geographic Data

Another way that the geographic data can be organized to enhance their use is to provide the data in layers. Some of the navigation functions use the data at different levels of detail. The map display function is an example of this type of function. When using the map display function, it is sometimes desired to provide for panning and zooming. Zooming can be done more efficiently if the data are organized into layers, with greater detail at the lower layers and less detail at the higher layers. When using the route calculation function, it is also advantageous to use the data at different levels of detail. For example, when calculating a route between two locations, it would be inefficient to examine all the possible road segments that diverge from each intersection along the route, including secondary streets and alleys. Instead, once a route is "on" a main road or expressway, it is generally preferable to stay on main roads or expressways until it is necessary to exit to secondary roads as the destination is approached. If the routing data are layered, higher layers that omit secondary roads can be used when possible to minimize the possible road segments to be investigated when calculating the route. Therefore, within some of the subsets of data types, the geographic data are provided in separate collections or groups corresponding to separate layers.

To implement layering, data entities, such as road segment data entities, are provided with a "rank." The rank of a road segment may be related to its functional class with road segments having a rank of "0" being slowest and narrowest, road segments having a rank of "1" being larger and faster, road segments having a rank of "2" being major roads, and so on. The "rank" of a segment data entity also specifies the highest data layer in which a road segment entity exists. For example, referring to FIG. 5, the route calculation subset type of geographic data 6 may include five separate collections of the data, R0, R1, R2, R3, and R4, each with a different level of detail, which can be used by the route calculation function. Similarly, the cartographic subset type of geographic data 6 may include five separate collections of the data, C0, C1, C2, C3, and C4, each with a different level of detail, which can be used by the map display function.

In the routing type of the geographic database, layer 0 (R0) includes segment data entities corresponding to all the portions of all the roads in the geographic region. Level 1 of the routing data comprises a separate subset (or collection) of the routing data and includes only the routing segment data entities (and some or all of their corresponding routing data attributes) having a rank of level 1 or higher. Level 2 of the routing data comprises a separate subset of the routing data and includes only the routing segment data entities (and some or all of their corresponding navigation data attributes) having a rank of level 2 or higher, and so on.

Similarly, the cartographic subset of geographic data may include separate collections (layers) of the data used by the map display function, each with a different level of detail. In the cartographic subset of the geographic data base, layer 0 includes segment cartographic data entities (and corresponding data attributes) corresponding to all the portions of all the roads in the geographic region. Level 1 of the cartographic data comprises a separate subset of the cartographic data and includes only the cartographic segment data entities (and corresponding data attributes) having a rank of level 1 or higher, and so on. Using these different layers of cartographic data, the map display function can provide rapid panning and zooming.

Although the organization of some of the data into layers results in some duplication of the data, the increased efficiency provided by layering generally offsets any disadvantages. As with the use of separate types of data mentioned above, the need arises to allow these layers to work together. Index files 11 which include cross references, search trees, or other finding techniques, may be provided for this purpose.

IV. Spatial Access to Geographic Data

Organizing the data into subsets or types and layering the data of some of the types provide separate collections of the data in sizes that are more manageable by each of the navigation functions. With respect to some subset types and layers of these types, the data can be further organized to facilitate spatial access.

Several of the navigation functions provided in a navigation system may require access to the geographic data spatially. One way this arises is that a function in a navigation application program requires finding a data entity record in a geographic database given the physical location represented by the data entity in the geographic region. The data entity may be a road segment record that represents a portion of a road in the geographic region and the function may require finding the road segment record based upon the physical location in the geographic region of the portion of the road represented by the road segment record. Another way spatial access arises is when a function in a navigation application program requires finding several or all of a type of data records located close to a location in the geographic region or within a defined area in the geographic region. For example, a function may require all road segment records encompassed within a rectangle defined by geographical coordinates (x, x+n) latitude and (y, y+m) longitude.

The route calculation function is a function of the type that may access geographic data spatially. This function provides a user of the system with an optimum route for traveling from one location in a geographic area to a destination location. In order to determine the optimal route, the route calculation function requires access to road segment data entities to determine certain data attributes, such as speed limits, turn restrictions, and so on, associated with the road segment data entities along the various possible routes between the starting location and the destination location. For example, as part of the route calculation procedure, when the route calculation function determines the optimum road to take from an intersection, it may access all the roads that lead from the intersection. Thus, all the road segment records that represent portions of roadways that meet at the intersection are accessed and examined. The route calculation function requires that the road segment records be accessed by locations in the geographic area of the roadways to which they correspond. The map display function and the maneuver generation function are also functions that may require access to geographic data spatially.

Assuming that all the data records for a given entire geographic region cannot be loaded into memory at the same time due to limited memory resources of the navigation system in which the navigation application program is being run, it would be desirable to load into memory only those data that are needed. Since some of the navigation functions require accessing data spatially, it would be advantageous to provide a means to load data into memory based generally upon the physical geographic locations of the features which the data represent or upon the geographical proximity of the features which the data represent. This can be done by parcelizing the data so that they are organized in the database and/or on the medium based upon the geographic locations of the features which are represented by the data. Different method for parcelizing geographic data are described below.

V. Parcelization of Geographic Data

There are several factors that can affect the operation and performance of a navigation application program when using geographic data. In order to provide a reasonably high level of functionality, a relatively large database may be provided. Storage media, such as CD-ROM or PCMCIA cards, are capable of handling databases of the size and complexity sufficient to provide suitable functionality. However, accessing these types of media can be relatively slow. Because navigation systems may be installed in vehicles, or may be hand-held, the hardware resources of the navigation system may be limited. Navigation systems installed in vehicles or hand held units may have limited memory resources and relatively slow media access rates.

As mentioned above, it is sometimes desirable to store the data representing the roads and intersections based upon the physical proximity of the physical features that they represent. In order to accomplish this, such data are organized into parcels with each parcel of data including data which represent features which are located physically proximate to each other in the geographic region. A parcel of data is established to be the smallest quantity of data that can be accessed at a time. This may relate to the quantity of data that can be accessed in a single disk access, although it may be related to some other factor. For some types of media such as a CD-ROM, a parcel may be established to a 16 Kilobyte quantity of data. (Other sizes of data may be used including 1 K, 2 K, 4 K, 8 K, 32 K, and so on.)

(For purposes of forming the data into parcels, the data are first separately organized into the different types, as described above, based upon the functions that access them, such as routing, map display, and maneuver generation. Further, the data are also organized into layers, as mentioned above, based upon rank. Therefore, this description of parcelization refers to the level 0 routing data although it is applicable to other types and levels of data as well.)

There are a number of different techniques for parcelizing geographic data. One parcelization procedure is disclosed in the copending application Ser. No. 08/740,295, filed Oct. 25, 1996, the entire disclosure of which is incorporated by reference herein. The parcelization method disclosed in Ser. No. 08/740,295 is briefly described below.

A. First Parcelization Process

A difficulty to be addressed when parcelizing geographic data is that some of the parcels may not have a desired fill percentage. This may occur in part because a geographic region is usually not uniformly-featured. Some parts of a geographic region have more features than other parts and therefore there is more data in the database representing those denser parts of the region than the parts that are less densely-featured. Then, a parcelization procedure that forms parcels of data based upon grouping together data which represent features encompassed within separate rectangular areas formed by a simple bisection of the entire geographic region may result in some rectangles containing significantly less data than the maximum parcel size.

The parcelization method described in Ser. No. 08/740, 295 overcomes this disadvantage by using both a normal bisecting procedure and a special dividing procedure to parcelize geographic data. According to Ser. No. 08/740, 295, if the data representing the features encompassed in a rectangle are greater than a predetermined multiple of the maximum parcel size, the rectangle is bisected into two equal sized sub-rectangles. However, if the data representing the features encompassed in a rectangle are less than the predetermined multiple of the maximum parcel size, the rectangle is divided using a special division procedure that increases the likelihood that the parcels formed will have a desired fill percentage.

When data representing the features encompassed in a rectangle are less than a predetermined multiple of the maximum parcel size, trial divisions of the rectangle are examined at locations in addition to a division by bisection. In one embodiment, divisions are examined at ½ along the rectangle (i.e. a bisection), ¼ along the rectangle, ¾ along the rectangle, ⅛ along the rectangle, ⅜ along the rectangle, and so on, through ³¹⁄₃₂ along the rectangle. A division is selected so that further divisions will result in the minimum number of parcels being formed of the data.

The parcelization procedure disclosed in Ser. No. 08/740, 295 may start with a rectangle that encompasses the entire geographic region, or preferably, it starts with a plurality of starting rectangles defined by a regular grid which is overlaid on the region. Such a grid is formed so that a starting rectangle is the largest rectangle allowed such that the data representing the features encompassed therein are permitted to form a parcel. Using a regular grid to define starting rectangles facilitates parcelization since it is unlikely that any of the first several divisions of a rectangle encompassing the entire region will form rectangles small enough to form a parcel. Thus, overlaying a grid represents several bisections of the entire region.

This parcelization procedure uses a minimum enclosing dividable-tile ("di-tile") for purposes of determining the point at which a division of any rectangle (or sub-rectangle) is made. Referring to FIG. 6, in this parcelization method, a minimum enclosing di-tile 200 is determined that encompasses a minimum bounding rectangle 202. A di-tile refers to an area of dimensions $2^I \times 2^J$ that includes all map data between latitudes $M \times 2^I$ navigation units and $(M+1) \times 2^I$ navigation units and between longitudes $N \times 2^J$ navigation units and $(N+1) \times 2^J$ navigation units, where M and N are integers, and I and J are positive integers). The navigation units 1, 2, ... an so on, may represent units equal to ¹⁄₁₀₀,₀₀₀th of a degree. (To allow di-tiles to overlap "0", i.e. latitude or longitude equal to "0", di-tiles may also have dimensions between $-2I, +2I$, where $I \geq 17$.)

One way of determining a minimum enclosing di-tile is to define acceptable intervals and to require that the minimum enclosing di-tile have as its sides only acceptable intervals. Acceptable intervals are defined in both directions of latitude and longitude. (Any arbitrary starting location may be chosen, but in a preferred embodiment, acceptable intervals conform to conventional latitude and longitude starting locations, i.e. the equator and Greenwich.) Acceptable intervals may be defined to include only powers of 2, for example: 0–1, 2–3, 4–5, 6–7, . . . , 0–3, 4–7, 8–11, 12–15, . . . , 0–7, 8–15, 16–23, 24–31, . . . , 0–15, 16–31, 32–47, 48–63, . . . , and so on (in navigation units). Acceptable intervals include $\{M*2I, (M+1)*2I\}$ where $M \in Z$ (where M is a member of the set of all integers Z), $I \geq 0$; or acceptable intervals may also include $\{-2I, +2I\}$ where $I \geq 17$ in order to obtain intervals that overlap latitude or longitude equal to 0.

In this embodiment, the sides of the minimum enclosing di-tile for the minimum enclosing rectangle are required to be acceptable intervals. Therefore, in this embodiment, the east-west coordinates of the initial di-tile are multiples of 2I units, and the north-south coordinates of the initial di-tile are multiples of 2J units. (I and J are integers so that the east-west length of the initial di-tile may have a dimension in units of 1, 2, 4, 8, 16, 32, 64, 128, 256, 512, or 1024, and so on, and the north-south length of the initial di-tile may have a dimension in units of 1, 2, 4, 8, 16, 32, 64, 128, 256, 512, or 1024 and so on, for example).

Once the minimum enclosing di-tile is established, the data can be parcelized. In one alternative, the parcelization process can begin by applying the regular division procedure, described below, to the minimum enclosing di-tile. Alternatively, the data in the coverage area are first examined based upon an organization of the data into a regular grid of rectangles formed from the minimum enclosing di-tile. This is equivalent to bisecting the minimum enclosing di-tile and then the rectangles (or squares) formed therefrom a number of times until a regular grid of rectangles results. Each of the rectangles in this grid may be referred to as an "initial tile" (corresponding to the "starting rectangle", above) The initial tile size is determined to be the largest geographic area allowed to be represented by one parcel at any layer of any of the types of data in the geographic database. In one embodiment, one fixed initial tile size is defined for all regions throughout the country so that regions can be more easily merged. In one present preferred embodiment, each of the initial tiles is of a fixed, predetermined size of $2^{17}$ navigation units by $2^{17}$ navigation units.

The placement of the boundaries of the grid is determined in order to include the region of the minimum bounding rectangle ("MBR") within a minimum enclosing di-tile. The MBR is the rectangle formed by the north-south line through the minimum longitude (corresponding to the easternmost node encompassed in the geographic region), the east-west line through the minimum latitude (corresponding to southern-most node encompassed in the geographic region), the east-west line through the maximum latitude (corresponding to northernmost node encompassed in the geographic region), and the north-south line through the maximum longitude (corresponding to the westernmost node encompassed in the geographic region). The grid boundaries are defined so as to correspond to the minimum enclosing di-tile when the grid is overlaid on the region. All the spatial data are encompassed and the initial tiles have a size as described above. In a preferred embodiment, the placement of the grid boundaries also conforms to the acceptable intervals, described above.

As mentioned above, a purpose of parcelizing the data is to include in each parcel an amount of data that is close as possible to, but not in excess of, a predetermined maximum parcel amount. For example, the predetermined maximum amount may be 16 Kilobytes.

Each one of the initial tiles in the grid is examined as a "trial parcel" to see if the amount of data in it fits into a single parcel. If the data within the "trial parcel", including any parcel overhead (such as index information and headers), would (accounting for data compression, if used) be less than or equal to the maximum parcel amount, then a parcel is constructed with that initial tile and no division of that initial tile for that particular data type is performed. On the other hand, any "trial parcel" that includes an amount of data that exceeds the predetermined maximum parcel amount is divided using one of the two following procedures as a function of the amount by which the data in the "trial parcel" exceeds the desired maximum amount. (In a preferred embodiment, an estimation technique, described below, is used in determining trial parcels. The estimation technique takes into account parcel overhead and compression without actually performing all the steps necessary to form a parcel.)

Regular dividing procedure. If the amount of data in a trial parcel exceeds the maximum parcel amount by a predetermined multiple, the trial parcel is divided into two rectangles. In a preferred embodiment, the division of the trial parcel into two rectangles is carried out by first determining the minimum enclosing di-tile for the trial parcel (in the manner described above with the initial tile), bisecting the enclosing di-tile, and then dividing the trial parcel where the line of bisection of the di-tile intersects the trial parcel. Alternatively the trial parcel may itself simply be bisected. (It is noted that a bisection of the enclosing di-tile will not always bisect the trial parcel, but instead may divide the trial parcel at an off-center location. For ease of reference herein, such division of the trial parcel will nonetheless be referred to as "bisection"). In either event, the line of bisection of the di-tile will be in either the longitudinal or latitudinal direction. In a one embodiment, the di-tile is bisected in whichever of the longitudinal or latitudinal divisions minimizes the maximum aspect ratio of the two resulting rectangles of the trial parcel.

Each of these resulting rectangles is then examined as a trial parcel, as described above, and bisected if the data contained in it exceeds a predetermined multiple of the maximum parcel amount. Each of these sub-rectangles is also then examined as a "trial parcel", as described above, and the process continues until the amount of data in a rectangle or sub-rectangle is less than the predetermined multiple of the maximum parcel amount. The predetermined multiple is chosen based upon a desired minimum fill percentage for each parcel. In one embodiment the desired minimum fill percentage is 80% and the predetermined multiple is 3.2 which can be derived from the following table (where D is an unacceptable data size and P is the maximum parcel size):

| Table of unacceptable sizes D |
| --- |
| $0 < D < 0.8 \times P$ |
| $P < D < 1.6 \times P$ |
| $2 \times P < D < 2.4 \times P$ |
| $3 \times P < D < 3.2 \times P$ |

The list stops at this point, because the next entry would be the empty range $4 \times P < D < 4 \times P.$ In one embodiment, the maximum parcel amount is predetermined to be 16 Kilobytes of data. (In alternative embodiments, the maximum amount may be predetermined to be another amount greater than or less than 16 K, such as 8 K or 32 K, or even amounts greater or less than these). Thus, trial parcels are bisected according to the regular procedure when their data content exceeds 51.2 kilobytes. When the amount of data in any trial parcel is less than the predetermined multiple amount, further subdivisions of the trial parcel follow the custom division procedure, described below.

Custom division procedure. If the amount of data in any trial parcel exceeds the maximum parcel amount, but is less than the predetermined multiple of the maximum parcel amount (e.g. 16 Kb<x<51.2 Kb), the following custom division procedure is used: Further divisions of the trial parcel are not necessarily bisections, but rather are made in a manner that tends to minimize the number of parcels created. This has the effect of minimizing both the space needed to store the parcels and wasted space within the parcels.

For example, given a trial parcel that contains data equal to 3.6 times the maximum parcel size or amount, it should be possible to fit this data into four parcels. However, bisection of the trial parcel may divide it into two rectangles of 1.2 times the maximum parcel size and 2.4 times the maximum parcel size, respectively, which would then end up in a minimum of five parcels if bisection were used to divide each of the rectangles. Therefore, subdivisions of the rectangle at this stage are made with the goal of minimizing the number of parcels created, but with the restriction that the division line not be arbitrary. More particularly, where a trial parcel has a data content that is greater than the maximum parcel size, but not in excess of the predetermined multiple thereof, the trial parcel is divided at a division of $2^{-x}$ along one of its dimensions. In a present preferred embodiment, $X=\{1,2,3,4,5\}$. Thus, the trial parcel is divided at ½ or ¼ or ⅛ or 1/16 or 1/32 divisions of its width. For example, a trial parcel may be divided into two rectangles with widths equal to ⅝ and ⅜, respectively, of the width of the trial parcel. This custom division may be applied directly to the dimensions of the trial parcel, or, in a present preferred embodiment, it may be applied to the dimensions of, a minimum enclosing di-tile of the trial parcel. In the latter case, the trial parcel is divided where the division line of the di-tile intersects the trial parcel. In either event, the division line will be in either the longitudinal or latitudinal direction.

Candidate division lines are examined as follows: First, divisions are made at each of the specified $2^{-x}$ divisions along both the longitudinal and latitudinal widths of the trial parcel. For each such division, the aspect ratios (defined as the ratio of the larger dimension to the smaller dimension) of each of the two resulting rectangles are determined, and the greater of the two is identified. The greatest aspect ratios identified for each of the candidate division lines are then compared, and the candidate division lines are ordered from smallest to greatest of such aspect ratios. The rectangles resulting from the candidate division lines are then examined, beginning with the first candidate line in the ordered list. The candidate division line chosen for dividing the trial parcel is the first one in the list encountered where the data content in one of its two resulting rectangles is less than or equal to a multiple (such as two times) of the maximum parcel size and greater than or equal to a minimum fill percentage times such amount. For example, the division line is chosen to include in one of the resultant rectangles an amount between 1.6 and 2.0 times the maximum parcel amount. This should enable making one more division of the rectangle to form two further sub-rectangles each with a fill percentage greater than 80% (0.8) of the maximum parcel amount. Each of these resultant sub-rectangles with a fill percentage between 80% and 100% of the maximum parcel amount is formed into a parcel. If no candidate division line meets this criterion, then the first candidate division line (i.e. the one with the smallest maximum aspect ratio) is used to divide the given rectangle.

EXAMPLE

The following describes how; during parcelization, a determination is made when to stop bisecting trial parcels, and to start the custom procedure of evaluating candidate divisions of 1/32, 1/16, 3/32, ⅛, 5/32, 3/16, 7/32, ¼, 9/32, 5/16, 11/32, ⅜, 13/32, 7/16, 15/32, ½, 17/32, 9/16, 19/32, ⅝, 21/32, 11/16, 23/32, ¾, 25/32, 13/16, 27/32, ⅞, 29/32, 15/16, and 31/32 along both the longitudinal and latitudinal widths of the trial parcel.

A target parcel fill percentage F is chosen. For the sake of example, let F be 0.8 (80 percent). As mentioned above, a maximum parcel size P is also determined. P is expressed in bytes and is the maximum amount of data that can be put into a parcel. Optimally, therefore, it is desired to create parcels in the range of F×P bytes and P bytes in size.

If a trial parcel having a data size D is in the range P<D<1.6×P, then it is not possible for parcels to be created therefrom whose data sizes fall in the target range. If the trial parcel is divided such that one resulting rectangle has a data size greater than or equal to 0.8×P, then the other one has a data size less than 0.8×P.

This process can be extended to give the list of non-acceptable data sizes in the Table of Unacceptable Sizes, above. From the above list a complementary list of acceptable data sizes can be generated:

| Table of Acceptable Data Sizes D: |
| --- |
| $0.8 \times P \leq D \leq P$ |
| $1.6 \times P \leq D \leq 2 \times P$ |
| $2.4 \times P \leq D \leq 3 \times P$ |
| $3.2 \times P \leq D$ |

The above list corresponds to a fill percentage F equal to 0.8. Other fill percentages generate different lists of acceptable or unacceptable data sizes. In general, the list of unacceptable data sizes is in the following form:

| Unacceptable Data Sizes D: |
| --- |
| $0 < D < F \times P$ |
| $P < D < 2 \times F \times P$ |
| . |
| . |
| . |
| $n \times P < D \leq (n + 1) \times F \times P$ |
| . |
| . |
| . |

. . . continuing until an empty range is reached.

The above is used as follows in the custom procedure for forming the parcels: The data sizes of each of the two rectangles resulting from a trial parcel division should fall within one of the acceptable ranges (whenever possible). In practice, this means that as long as the data size in a rectangle is somewhat larger than the high end of the highest unacceptable range (3.2×P, in the example), the rectangle can be divided according to the above-described bisection procedure. Once the high end of the highest unacceptable range is approached, custom divisions (i.e., divisions of 1/32, 1/16, 3/32, ⅛, etc. in this example) are considered.

Candidate division lines are examined and compared in the manner described above, and the one selected for division is where the following criterion is met. The amount of data falling into each of the two sub-rectangles of the trial parcel is of a size such that it is theoretically capable of, in turn, being subdivided into rectangles that, on the average, achieve a specified minimum parcel data fill percentage. Some cases may occur in which the above criterion cannot be met.

The data are divided at the division line chosen in the custom division procedure, and, for each of the two sub-rectangles created, the custom division process is repeated as necessary. As mentioned above, the bisection and custom division procedure can be applied either directly to the trial parcel or to the minimum enclosing di-tile of the trial parcel, although the latter is preferred. It is noted that in some cases the minimum enclosing di-tiles are exactly equal to trial parcel boundaries. This may occur with respect to the initial tiles. The utility of defining the divisions in terms of the minimum enclosing tiles is that a tile can be repeatedly divided in half evenly, whereas a trial parcel rectangle of arbitrary dimensions cannot. Another advantage is that this procedure facilitates processing at boundaries between different databases. The custom division of a trial parcel at a $2^{-x}$ division of the tile's side is equivalent to a sequence of from 1 to X bisections. Consequently, the division lines, and therefore the resulting sub-rectangles, can be represented in a minimal number of bits (5 bits for $\frac{1}{32}$ divisions, as opposed to up to eight or sixteen bytes to define an arbitrary rectangle).

(In examining amounts of data included in rectangles, a convention is established that any data entity that is located exactly on a dividing line is included with the data in the rectangle "to the right" ("east") of the line, if the dividing line is a north-south line, and with the data "above" ("north of") the line, if the dividing line is an east-west line.)

The above procedure is performed on all the initial tiles (and, where necessary, all resulting rectangles) in the grid.

B. Second Parcelization Process

Another parcelization procedure is described in the patent application entitled "METHOD AND SYSTEM FOR PARCELIZATION OF GEOGRAPHIC DATA FOR STORAGE AND USE IN A NAVIGATION APPLICATION" filed Sep. 5, 1997, U.S. Ser. No. 08/924,328 the entire disclosure of which is incorporated by reference herein. This parcelization method is a further improvement and can be used in conjunction with the parcelization procedure described in Ser. No. 08/740,295.

In the parcelization method described in Ser. No. 08/740, 295, it was proposed as an example that parcels at least 80 percent filled are desired. For a parcel size "P", a rectangle containing 2.7×P bytes of data can be divided in different ways. For example, it can be divided into two rectangles containing 1.35×P bytes of data each. Each sub-rectangle can then be divided into two sub-rectangles to obtain rectangles encompassing data less than the optimal parcel size, resulting in a total of four parcels averaging 68 percent filled. Alternatively, the initial division could be into sub-rectangles with a 1.8×P and 0.9×P bytes of data, and then the former sub-rectangle can be divided into two sub-rectangles of 0.9×P bytes each, for a total of three parcels 90 percent filled.

The decision made in the above example is based on a table of acceptable data size ranges according to the following table:

TABLE 1

| Minimum | Maximum |
| --- | --- |
| 0.8 × P | 1.0 × P |
| 1.6 × P | 2.0 × P |
| 2.4 × P | 3.0 × P |
| 3.2 × P | — |

In the parcelization method described in Ser. No. 08/740, 295, the above table is used to determine that a dividing line is acceptable based upon when it divides a rectangle into two sub-rectangles each of whose data sizes falls within one of the ranges above.

In many situations, the decision will also be constrained by the accuracy with which a data size of a parcel can be estimated before the parcel is created. The parcelization method disclosed in the aforementioned patent application entitled U.S. Ser. No. 08/924,328 addresses this consideration as follows. If it is assumed that the data size can be estimated to within an accuracy of 4 percent, then to provide for parcels falling between 80 percent and 100 percent filled, without exceeding the optimum size, it is required to modify the above table to take a 4 percent error into account:

TABLE 2

| Minimum | Maximum |
| --- | --- |
| 0.84 × P | 0.96 × P |
| 1.68 × P | 1.92 × P |
| 2.52 × P | 2.88 × P |
| 3.36 × P | 3.84 × P |
| 4.20 × P | 4.80 × P |
| 5.04 × P | 5.76 × P |
| 5.88 × P | — |

However, in some situations dividing lines can be considered that produce sub-rectangles falling within acceptable ranges in the first table, but not the second table. Therefore, a hierarchy of two or more tables is used. In the example here, if a dividing line is found whose sub-rectangles fall within acceptable ranges in the second table, that dividing line would be selected. Otherwise, a dividing line whose sub-rectangles fall within acceptable ranges in the first table would be selected.

It could also happen that, for a particular dividing line, one sub-rectangle might be acceptable based on both the first and second tables, and the other acceptable based on the first table only. Each dividing line is therefore scored as follows: each of the two sub-rectangles are scored according to the tables its data size falls into, and the score of the dividing line is defined as the sum of the two sub-rectangle scores. In this example, a dividing line both of whose resulting sub-rectangles fall into a range in the second table would score highest, and a line both of whose sub-rectangles fall into a range in the first table but not in the second table would score lowest. The best dividing line is then selected using these scores.

Aspect ratio (the ratio between the sides of a rectangle) is also taken into account, as follows: For a given dividing line, the aspect ratio of each of the two sub-rectangles is determined, and the aspect ratio for the dividing line is defined to be the least desirable (largest) of the two sub-rectangle aspect ratios. Only dividing lines whose aspect ratios are smaller than a fixed maximum aspect ratio are considered qualified candidates. Of the qualified candidates, the one with the best score will be selected.

A further refinement of this method is as follows: In some situations, it may not be possible to achieve the target fill percentage (e.g. 80–100 percent), because real-world data are too discontinuous. When this occurs, some the data sizes of some parcels will fall in the range between (0–80) percent of the optimal parcel size. Under these circumstances, it would be preferable if the parcel size were equal to the optimal percent size divided by 2 K. If a buffer size in the memory of the navigation system is P, then it is possible to make more efficient use of buffer space if the parcel sizes are P, P/2, P/4, etc. (rather than ¾×P, ⅝×P, etc.). The reason for this is as follows. When a record size is P/2 K, it is more likely that a buffer slot can be found for it without rearranging other records in the cache of the memory of the navigation system. Therefore, when the data size of the rectangle being divided is less than 2×P, the tables described above are augmented with additional ranges representing the optimal parcel size divided by 2 K, for K in the range from 1 to about 3. In the above example, the two tables would be augmented with the following ranges:

|  | Minimum | Maximum |
| --- | --- | --- |
| First Table: | | |
| | 0.1 × P | 0.125 × P |
| | 0.2 × P | 0.25 × P |
| | 0.4 × P | 0.5 × P |
| Second Table: | | |
| | 0.105 × P | 0.12 × P |
| | 0.21 × P | 0.24 × P |
| | 0.42 × P | 0.48 × P |

In the First Table, above, acceptable ranges are defined for 80% to 100% of ⅛ times the maximum parcel size (0.1 P–0.125 P), 80% to 100% of ¼ times the maximum parcel size (0.2 P–0.25 P), and 80% to 100% of ½ times the maximum parcel size (0.44 P–0.5 P). In the Second Table, above, acceptable ranges are defined that take into account the approximately 4% tolerance for errors in estimating. In the Second Table, above, acceptable ranges are defined for 84% to 96% of ⅛ times the maximum parcel size (0.105 P–0.12 P), 84% to 96% of ¼ times the maximum parcel size (0.21 P–0.24 P), and 84% to 96% of ½ times the maximum parcel size (0.42 P–0.48 P). Thus, the parcelization method described in the aforementioned patent application U.S. Ser. No. 08/924,328 facilitates use of the geographic data for many types of navigation functions.

C. Subsequent Parcelizations

Each of the different types of data (routing, cartographic, maneuver, and so on) and each layer of some of these types of data, are separately parcelized using any of the procedures described above. The different types of data and the separate layers of data of the each type may be parcelized in parallel. This means that after one type of data is parcelized, parcelization of another type of data is performed using the same rectangle boundaries (i.e. dividing lines) that were used for the first type. Parcelizing may start with the type of data expected to be most dense. A subsequent parcelization of a less dense type of data will follow the same rectangle boundaries that were used for the first type of data. However, since the second type of data may be less dense, it may be possible to form a parcel of the second type of data without making as many divisions of rectangles encompassing the features represented by the data. This would have the result that a parcel of one type of data may represent geographic features encompassed by a larger sized rectangle than a parcel of another type of data. However, whenever a division of data is to be made, it is made along the same rectangular boundary division as was made in the prior type of data.

When parcelizing one type of data after a first type of data has already been parcelized, it may sometimes occur that the subsequent type of data is more dense in a portion of the region than the type of data which has already been parcelized. In this situation, the smallest rectangle formed by the prior parcelization of data may not be small enough for forming a parcel of data of the subsequent type of data. In such a situation, the subsequent type of data may be further parcelized. A procedure for performing such an additional parcelization is described in the aforementioned patent application U.S. Ser. No. 08/924,328.

As mentioned above, some of the types of data may be layered. Each layer is treated as a separate type of data for purposes of parcelization. Accordingly, for higher layers of data, i.e. layers having fewer data entities in them, parcelization is performed on the data, starting with a collection of all the data for the entire region that meet the criteria for inclusion in that layer. When parcelizing higher layers of a type of data, the same rectangle boundaries determined for the parcelization of layer 0 are used. Since higher layers of a type of data are less dense than layer 0 (which includes all the data entities of a type for all ranks), parcels may be formed by rectangles of a larger size.

D. Alternative Parcelization Methods

In addition to the above described ways to parcelize the geographic data, there are other ways in which the data can be parcelized. For example, a simple parcelization method may provide for separating the geographic data into a plurality of parcels wherein the data in each parcel represent features encompassed within a separate one of a plurality of regular sized rectangles which together form a regular, rectangular grid over the geographic region. Another method for parcelization is to separate the data into parcels encompassed within rectangular areas where each of the rectangles is formed by a bisection of the another rectangle until a parcel size below a maximum threshold is obtained. Some of these parcelization procedures are described in the copending patent application entitled "METHOD AND SYSTEM FOR FORMING AND USING GEOGRAPHIC DATA" filed Sep. 5, 1997, U.S. Ser. No. 08/935,809 the entire disclosure of which is incorporated by reference herein. Still another method of parcelization to which the disclosed subject matter can be applied is described in U.S. Pat. No. 4,888,698.

E. Ordering of Parcels

As the parcels are formed for all the types of data and for all the layers of each type, the parcels are ordered. Various types of ordering may be used. In general, it is preferred that the parcels be ordered in a manner that minimizes searches for data. In some of the functions in a navigation application program, there is sometimes a requirement to access data that represents features along routes or paths across parts of the geographic region. This may occur when calculating a route across the geographic region or when panning across the region. Sometimes these routes or paths extend over more than one of the rectangles from which the parcels of data were formed. Accordingly, starting with data in one parcel, there is a requirement for accessing the data in another parcel formed from a rectangle which is located adjacent to the rectangle from which the first parcel was formed. Since each rectangle may have several other rectangles adjacent to it, there is a need for ordering the parcels formed by the rectangles to minimize searches.

One way to order parcels is to use a depth-first ordering from the kd-tree index within each parcel type and layer. This provides an ordering similar to Peano-key ordering. Parcels are stored on disk in this approximate Peano key order. An index in the form of a kd-tree can be used to access parcels containing route calculation data spatially. This index is useful for initial location of an arbitrary position, such as when a route guidance program in a navigation system initially locates the map data corresponding to a current vehicle position.

Once a position is known, the disk location of connected or nearby map data can sometimes be found using data internal to a parcel. For example, if a data record for the right node of a road segment in parcel A is outside of parcel A, the disk location of the parcel containing that node can be found within parcel A.

VI. Organization of Data Within Parcels

Organization of geographic data into parcels using the processes described above provides advantages that enable a navigation system that uses the geographic data to find needed data more quickly thereby speeding up operation of the navigation system. Organizing the geographic data within at least some of the parcels provides further advantages that enable the navigation system using the data to operate even more quickly. A present embodiment provides for an organization of the data within at least some of the parcels and an index structure used with data organized in this manner. Use of the present embodiment facilitates spatial searches for data within a parcel, thereby enhancing operation of the navigation system that uses the data.

According to a present embodiment, in at least the bottom layer of one type of data (for example, routing layer 0), and alternatively in other layers and in other types of data, node data records are stored in Peano key order within the parcel based on latitude and longitude. Segment data records are stored in approximate Peano key order based on the latitude and longitude of the segment's left node. (A segment's "left node" is the node whose coordinates are the further west of the two nodes associated with the segment. If both nodes have the same longitude, then the node whose coordinates are further south of the two nodes is selected. The use and definition of the segment's left node for purposes of defining a segment's position for storage purposes is arbitrary. For example, in alternative implementations, the right node, the up node, or the down node may be used instead. However, whichever node definition is uses, it should be applied consistently throughout the portion of the database organized in this manner.)

Using this Peano ordering, all nodes and all segments in the region are given a unique entity identifier. This is achieved as follows: (1) bottom layer route calculation data are parcelized; (2) parcels are then processed in order by the Peano keys of their southwest corners; (3) for each parcel processed in this order, segment (or node) entities are given entity identifiers in Peano key ordering. At higher layers, segment and node records may be stored using a different ordering within the parcel, such as by entity identifier. It is noted that if entity identifiers are used for ordering at higher layers, the Peano key ordering may be inherited from the bottom layer. The organization may be used with any of the parcelization processes disclosed above or with any other parcelization process that organizes data spatially.

FIGS. 7–10 illustrate application of the present embodiment to organize geographic data within a parcel. FIG. 7 shows a map 300 of a portion of a geographic region, such as the geographic region 12 of FIG. 1. Illustrated on the map are a plurality of geographic features, such as road segments 22, end points 23 of road segments, and positions 24 along road segments, which are represented in the map database by road segment entities, node entities, and shape points, respectively. Also, illustrated on the map 300 is a rectangle 302. The rectangle 302 represents an area determined by a parcelization process, such as one of the parcelization processes described above. The data entities (in a layer in a type of the geographic database) which represent features encompassed within the rectangle 302 are grouped together within a single parcel of the database. In the present embodiment, the parcel contains routing layer 0 data, but in alternative embodiments other layers and types of data can be used. Although only a few geographic features are shown in the area 300, it is understood that in a typical map database formed by any of the processes mentioned above, there may be hundreds or thousands of features or more represented in each parcel. Also, although only one area 300 is shown which corresponds to one parcel, it is understood that the present embodiment is applied to all areas that together make up the entire geographic region represented by the map database, and further that the present embodiment is applied in all parcels of at least one layer of at least one type.

According to the present embodiment, the data within the parcel are organized to facilitate spatial searches. In the present embodiment, each of the rectangular geographic areas (such as the area 302 shown in FIG. 7) that encompasses geographic features which are represented by a separate collection of data entities contained in a separate parcel is subdivided into a plurality of sub-areas 307. In one embodiment, these sub-areas 307 are sub-rectangles and eight such sub-rectangles are formed from the rectangular geographic area that encompasses the collection of data entities from which each single separate parcel is formed. In the embodiment shown in FIG. 7, the sub-rectangles 307 formed from the rectangle 302 are labeled 307(0) through 307(7). (In alternative embodiments, more or fewer than eight sub-rectangles may be formed although it is preferred that the number be equal to an integer power of 2, e.g. 4, 8, 16, 32, etc.)

In forming the sub-rectangles 307, boundaries of each sub-rectangle are selected so that each of the sub-rectangles contains approximately the same number of shape points and nodes as the other such sub-rectangles of the parcel. Shape point information in the bottom layer is stored as a contiguous array of two- to five-byte delta position records ranging from −32768 to +32767 navigation units (each of which is equal to $\frac{1}{100,000}$th of a degree, as mentioned above) from the position of the previous shape point. Each segment record contains a count of shape point records and a pointer to its first shape point.

In a present embodiment, the procedure used to separate the data within the parcel may be similar to the procedure that was used to form the parcels. Any of the procedures described above for determining the rectangular areas for forming parcels may be used. In one process, cuts "C" are defined at any $\frac{1}{32}$ division of a parcel rectangle's minimum enclosing $2^I \times 2^J$ di-tile. For example, a division exactly in half is represented as a $\frac{16}{32}$ cut. In FIG. 7, each cut, labeled C1, C2 . . . C7, represents a division of the rectangular area 302 using this procedure to form the eight sub-rectangles 307(0) through 307(7), each of which contains relatively the same amount of data as the other sub-rectangles. Each sub-rectangle 307 is assigned an index 310 in the range 0–7.

Figure 9:
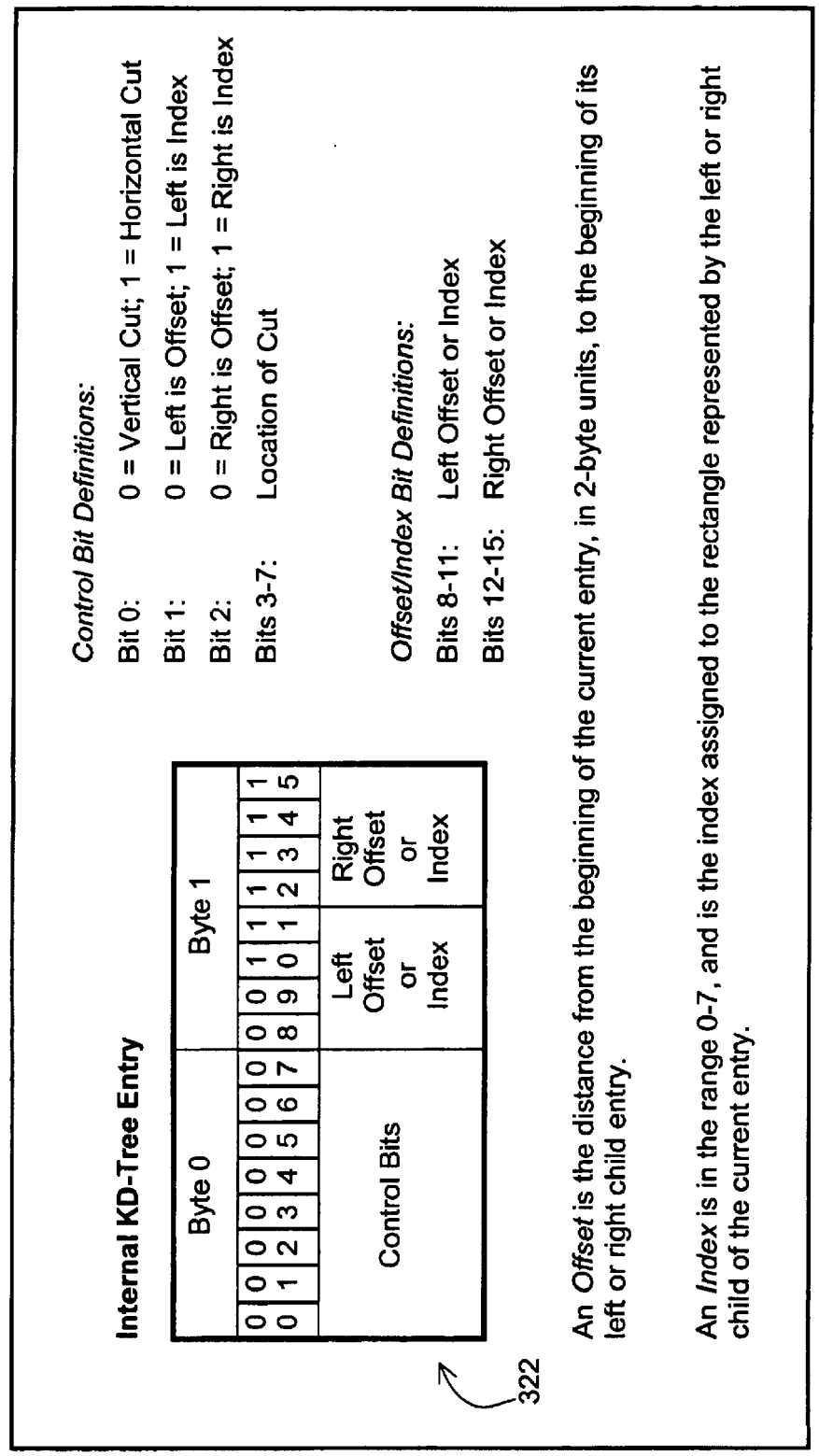
FIG. 9 illustrates the kd-tree structure of FIG. 8 stored as data in the map database.

This subdivision of the parcel's rectangular area 302 into sub-rectangles 307 may be represented by a kd-tree. (This kd-tree is used to represent the sub-rectangles within a parcel and is separate from any kd-tree structure which may be used to represent the division of data at the parcel level.) FIG. 8 graphically illustrates a kd-tree 322 representing the sub-rectangles 307(0) through 307(7) of FIG. 7. The kd-tree 322 of FIG. 8 also illustrates the division of the rectangle 302 into the sub-rectangles 307 by the series of cuts C1 . . . C7. Each of the leaf or internal nodes 326 of the kd-tree 322 corresponds to one of the sub-rectangles 307 so formed. (In this embodiment, eight sub-rectangles 307 are formed and therefore the kd-tree 322 has eight leaf nodes 326.) This kd-tree 322 is stored in the map database either in the parcel itself or in an index file, such as in the index file 11 of FIGS. 4 and 5, located elsewhere in the database. FIG. 9 represents how the data in the kd-tree 322 are stored in the map database. This kd-tree 322 may be used to narrow down the list of segment records that need to be examined in a spatial search for segment records within the parcel.

Referring to FIG. 10, the kd-tree 322 formed for each parcel is used to form a data structure 320 for each parcel. The data structure 320 may be a bitmap, a bitmask, or other type of index. Each segment record in the parcel is checked against each sub-rectangle formed for its respective parcel. The segment record is assigned the index 310 of any sub-rectangle it intersects. A segment can intersect multiple sub-rectangles, so an 8-bit bitmap (each bit of which corresponds to a sub-rectangle) is associated with each segment. In FIG. 10, the data structure 320 is a bitmap. The bitmap 320 includes entries for all the segments in the parcel formed from the data entities encompassed within the rectangle 302 shown in FIG. 7. (For the sake of clarity, only some of the segments are portrayed.) For example, segment 22(1) and segment 22(2) are located entirely in sub-rectangle 307(0). These segments do not intersect any sub-rectangles other than sub-rectangle 307(0). Accordingly, the entries for these two segments in the bitmap 320 have bits only in the column associated with the sub-rectangle 307(0). Likewise, segment 22(n) intersects only sub-rectangle 307(1) and accordingly, it is associated only with the sub-rectangle 307(1) with a bit in the index 310 corresponding to the sub-rectangle 307(1). However, segment 22(g) intersects both sub-rectangles 307(1) and 307(4), and accordingly it has bits associated with both theses sub-rectangles in the bitmap 320. Segment 22(e) intersects sub-rectangles 307(0), 307(2), 307(3), and 307(7). Accordingly, segment 22(e) has bits associated with these four sub-rectangles in the bitmap 320.

The data structure 320 is stored in the map database with the kd-tree 322 either in the parcel itself or in an index file, such as in the index file 11 of FIGS. 4 and 5, located elsewhere in the database. The internal spatial index formed by the internal kd-tree 322 and the bitmap 320 can be used to facilitate identification of data entity records when searching within the parcel. If the geographic coordinates are provided, the kd-tree 322 can be used to quickly identify which of the sub-rectangles 307 contains data encompassing the coordinates. Using the bitmap 320, the segment data entities that intersect the sub-rectangle or sub-rectangles can quickly be identified. Additional advantages follow when a search area encompasses more than one parcel. Under these circumstances, using the bitmaps 320 associated with each of the intersected parcels, the data entities in the sub-rectangles of each of the intersected parcels can quickly be identified.

Example 1

An exemplary use of a geographic database incorporating the features of the above embodiment is described in connection with FIGS. 11 and 12. A navigation system 500 uses a geographic database 530 stored on a medium 540 (such as a CD-ROM, PCMCIA card, a DVD disk, or other suitable storage medium). The navigation system 500 may be in a vehicle (not shown). The geographic database 530 is parcelized, i.e., it is separated into a plurality of parcels. Within each parcel 516 of at least one layer of at least one type of geographic data, the data are arranged internal of each of the parcels according to the embodiment described above and an internal kd-tree index 322 and bitmap 320 are provided for each parcel so arranged.

According to this example, the end-user operating the navigation system 500 may want to have the area in which he/she is located displayed on a computer display associated with the navigation system. Alternatively, the navigation system 500 may require all the routing data in the vicinity of the navigation system 500 in order to calculate a route to another location in the search area. In a still further alternative, the end-user may have entered a destination location into the navigation system 500 and the navigation system 500 requires all the routing data records around the destination location in order to calculate a route to the destination.

A navigation application program 520 is part of the navigation system 500. The navigation application program 520 includes the software component portion of the navigation system 500. The navigation application program 520 includes suitable programming to define an appropriately-sized rectangular area based upon the function being requested by the end-user. For example, if the end-user wants an optimum route between a starting location and a destination location, the navigation application program 520 may require all the routing data within a one kilometer square area around both the starting location and the destination location. The navigation application program 520 determines the coordinates of these suitably-sized rectangular areas. The navigation application program 520 then accesses the medium 540 upon which the geographic database 530 is stored to obtain all the routing data records that represent the road segments encompassed within the two rectangular areas. In a present embodiment, the navigation application program 520 obtains the data by calling an interface layer 550. The interface layer 550 is a library of software programs that provides an interface between the navigation application software 520 and the geographic database 530. The interface layer 550 isolates the navigation application program 520 from the complexity and evolution of the geographic database 530. (The interface layer 550 is not essential to the present embodiment and in an alternative implementation the navigation application program 520 may access the geographic database 530 directly.)

Figure 11:
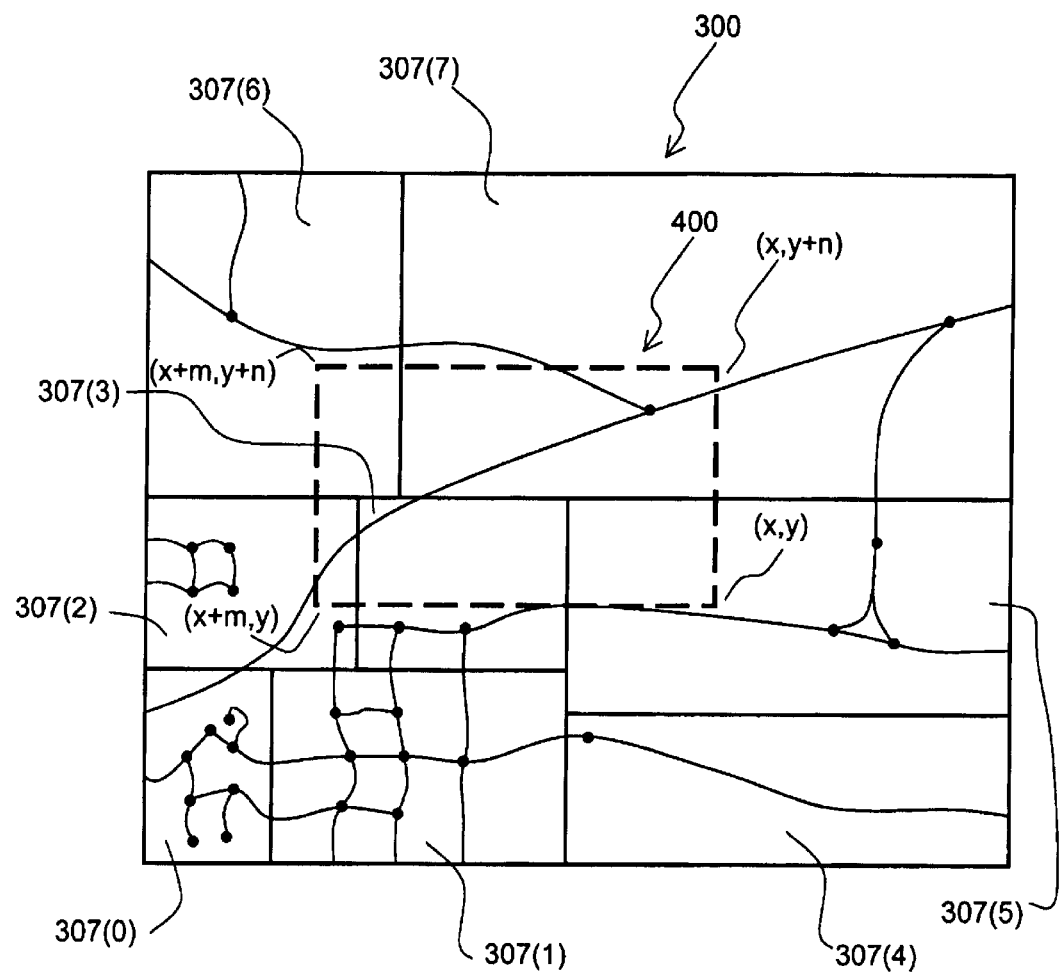
FIG. 11 shows the map of FIG. 7 illustrating use of an embodiment for spatial searches.
Figure 12:
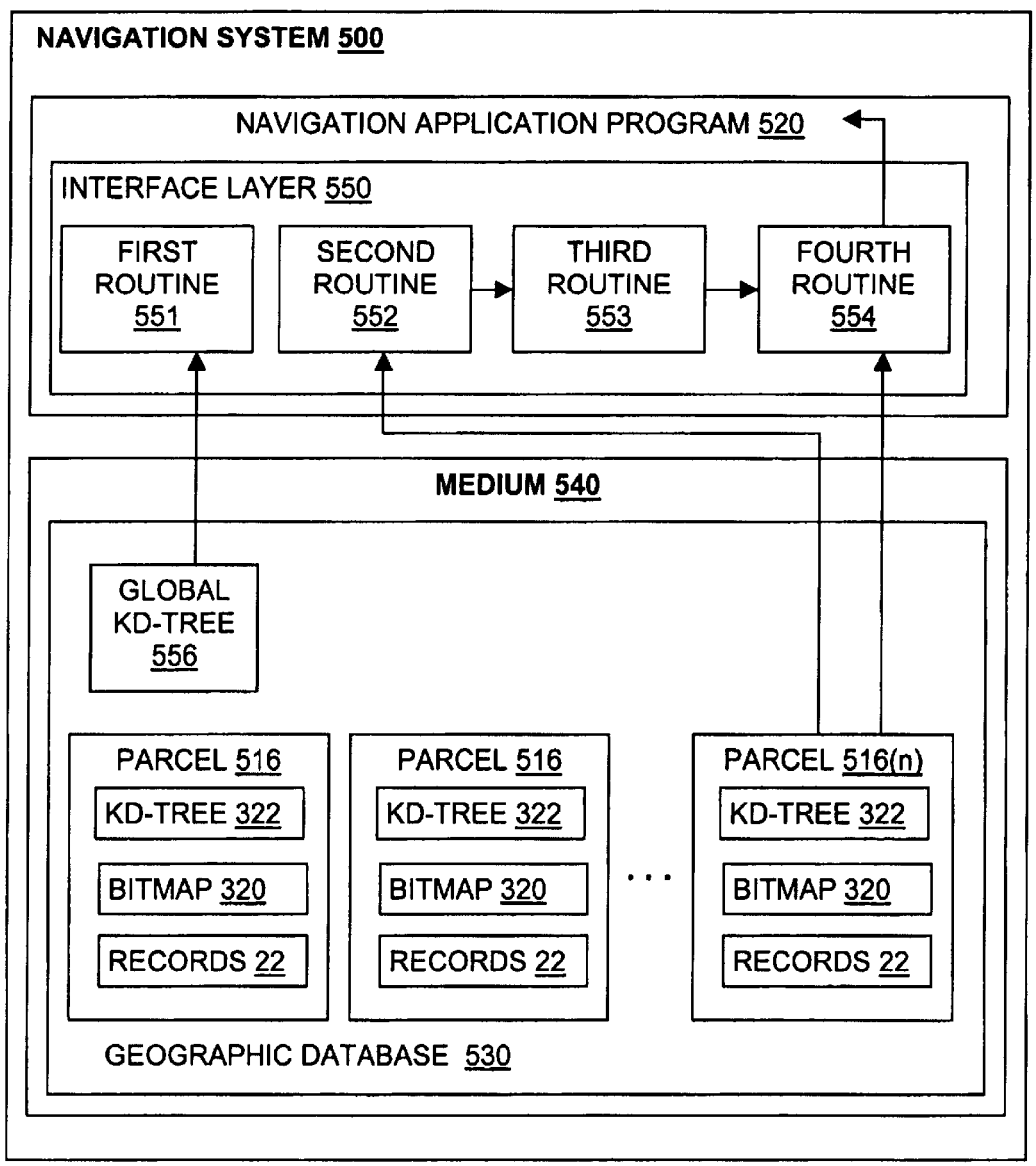
FIG. 12 is a block diagram showing a navigation system that includes an embodiment of a programming application that accesses data arranged in accordance with a parcelized map database having parcel internal data structures that facilitate spatial searches.

FIG. 11 shows the same geographic area 300 as shown in FIG. 7. Some of the geographic features area shown and the sub-rectangles 307(0) through 307(7) are shown, but other features are omitted for the sake of clarity. Superimposed on the area 300 is a search rectangle 400. The search rectangle 400 represents one of the areas about which the navigation application program 520 requires data. For example, the search rectangle may represent an area in which the vehicle is located. The search rectangle 400 is defined by coordinates (x, y), (x+m, y), (x, y+n), and (x+m, y+n). These coordinates are defined by the navigation application program 520 given a vehicle position within the area of the rectangle 400.

Using an appropriate index, such as a global kd-tree index 556 that represents the parcels 516, the parcel 516(n) that contains the data encompassed within the geographic area 300 is identified, accessed, and read. This step may be performed by a first routine 551 in the interface layer 550. Once the parcel 516(n) is read from the media 540 upon which the geographic database 530 is stored, the data entities in the parcel 516(n) may be in a compressed format. Thus, even though all the data in the parcel 516(n) is in the memory of the navigation system 500, there are still computational resources associated with de-compressing or otherwise processing the data in the parcel to identify the data included in the parcel that represent the road segment features contained within the boundaries of the search rectangle 400. Although it is possible to de-compress and examine all the data in the parcel 516(n) to identify the data that represents the road segment features within the search rectangle 400, this would involve de-compressing and examining many data records which do not represent features in the search rectangle 400, resulting in wasted effort and possibly slower performance. Using the parcel's internal kd-tree 322 and bitmap 320 that associates the parcel's data records with each of the sub-rectangles avoids this wasted effort and may improve performance of the navigation system 500.

The global kd-tree search indicates which parcels are completely contained in the search rectangle and which parcels partially intersect the search rectangle. The internal kd-tree and spatial bitmaps need to be examined only for parcels which partially intersect the search rectangle, because for parcels completely contained in the search rectangle all data contained in the parcel a fortiori intersect the search rectangle. Similarly, the search of a parcel's internal kd-tree indicates which of the parcel's sub-rectangles are completely contained in the search rectangle and which of the parcel's sub-rectangles partially intersect the search rectangle. Segments which intersect sub-rectangles that are completely contained in the search rectangle a fortiori intersect the search rectangle, so only those segments which intersect sub-rectangles that partially intersect the search rectangle must be examined in further detail. This detailed examination involves decompressing the segment record data and computing the intersections of each successive segment portion between consecutive shape points with the search rectangle. (This detailed examination of a segment can stop when the intersection is non-empty thereby establishing that the segment intersects the search rectangle).

Using the coordinates of the search rectangle 400 in the internal kd-tree 322 for the parcel 516(*n*), the sub-rectangles 307 within the parcel 516(*n*) that intersect the search rectangle 400 can be identified. This step may be performed by a second routine 552 in the interface layer 550. The second routine 552 compares the geographic coordinates of the search rectangle 400 with the sub-rectangles 307(0) through 307(7) to determine which sub-rectangles fall completely within the search rectangle, which sub-rectangles fall completely outside the search rectangle, and which sub-rectangles fall partially within the search rectangle. In the example shown in FIG. 11, the search rectangle 400 is shown to intersect only the five sub-rectangles 307(2), 307(3), 307(5), 307(6), and 307(7). Using the bitmap 320, the segment data records 22 within the parcel that intersect these sub-rectangles can be readily identified. This step may be performed by a third routine 553 in the interface layer 550. In using the bitmap 320, the segment records that intersect these five sub-rectangles can be identified by determining any segment entry that has at least one bit on (e.g., "1") for the sub-rectangles in question. Only these segment records are de-compressed and examined to determine whether the segments fall within the search rectangle 400. The de-compression and examination can be performed by a fourth routine 554 in the interface layer 550. The segment records that fall in the other three sub-rectangles, 307(0), 307(1), and 307(4), do not have to be de-compressed and examined, thereby avoiding unnecessary computation that may slow down operation of the navigation system. Once the data records associated with the five sub-rectangles that intersect the search rectangle are identified, they are de-compressed and examined to determine whether they are encompassed within the search rectangle 400. Not all the segment records in the five sub-rectangles are necessarily encompassed within the search rectangle 400, so not all of them are returned to the requesting routine in the navigation application 520. Use of the internal kd-tree 322 and bitmap 320 considerably reduces the number of records that have to be de-compressed and examined.

It is noted that using the internal kd-tree 322 and the bitmap 320 adds some additional processing steps. However, the additional processing steps associated with the use of the internal kd-tree and bitmap are generally more than offset by avoiding the de-compression and examination of unnecessary segment records. It is noted that use of the internal kd-tree 322 and bitmap 320 generally provides greatest advantages when the search area 400 is relatively small compared to the rectangle 300 from which the parcel is formed. This factor can be used to selectively skip using the internal kd-tree 322 and bitmap 320 when the search rectangle is above a certain predefined percentage of the size of the rectangle from which the parcel was formed.

Example 2

Figure 13:
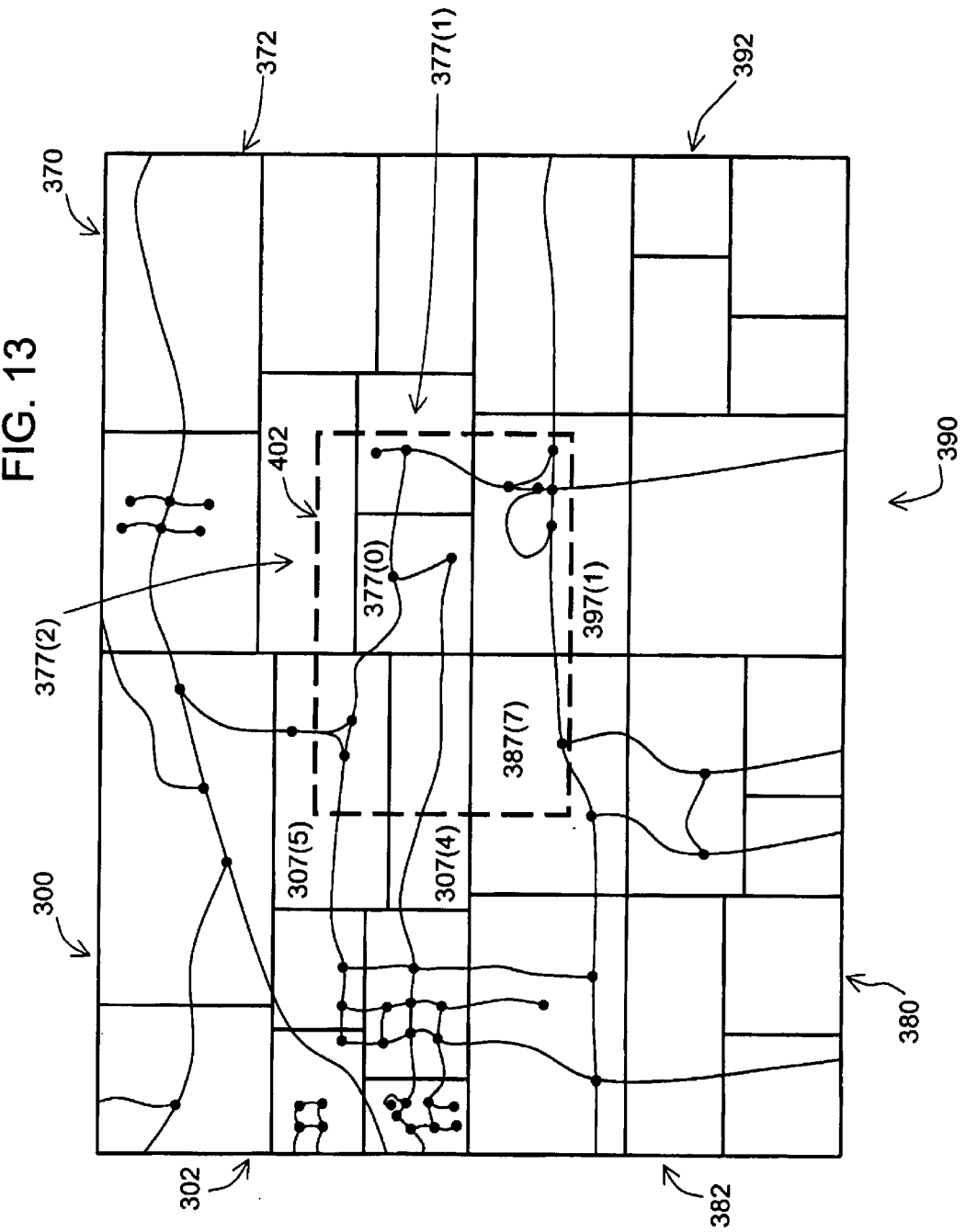
FIG. 13 shows a map of a portion of a geographic area illustrating use of an embodiment for spatial searches with more than one parcel.

Another exemplary use of a geographic database incorporating the features of a present embodiment is described in connection with FIGS. 12 and 13. As in the previous example, the navigation system 500 uses the parcelized geographic database 530 and within each parcel 516 of at least one layer of at least one type of geographic data, the data are arranged using sub-rectangular areas according to the embodiment described above. As further mentioned above, an internal kd-tree index 322 and bitmap 320 are provided for each parcel so arranged.

In this embodiment, the search rectangle requested by the navigation application program 520 encompasses data entities in more than one parcel. FIG. 13 shows the same geographic area 300 as shown in FIGS. 7 and 11, and in addition, FIG. 13 shows adjacent geographic areas 370, 380, and 390. Each of these geographic areas is encompassed by a separate rectangle, 302, 372, 382, and 392, respectively. The data encompassed by each of these rectangles are contained in separate parcels 516 in the geographic database 530. Although these rectangles 302, 372, 382, and 392 are shown to be the same size, they do not have to be.

Superimposed on the areas 300, 370, 380, and 390 is a search rectangle 402. The search rectangle 402 represents the area about which the navigation system 500 requires data. The search rectangle 402 overlaps a part of each of the four areas 300, 370, 380, and 390.

Using the global kd-tree index 556 that represents all the parcels 516, the four parcels that contain the data encompassed within the geographic areas 300, 370, 380, and 390 can be accessed and read from the media 450 upon which the geographic database 530 is stored. As noted in the previous example, the data entities in these parcels may be in a compressed format. Thus, even though all the data in the four parcels are in memory, there are still computational resources associated with de-compressing or otherwise processing the data in these four parcels to identify which of the data in these four parcels represent features contained within the search rectangle 402. Using the internal kd-trees 322 and bitmaps 320 associated with each of these parcels 516 avoids this wasted effort.

Using the coordinates of the search rectangle 402 with the internal kd-trees for each of the parcels, the sub-rectangles within each rectangle represented by each of the parcels that intersect the search rectangle 402 can be identified. This step may be performed by the second routine 552 in the interface layer 550 which compares the geographic coordinates of the search rectangle with the sub-rectangles of each of the intersected parcels. As mentioned above, the first routine determines which sub-rectangles fall completely within the search rectangle, which sub-rectangles fall completely outside the search rectangle, and which sub-rectangles fall partially within the search rectangle. In the example shown, the search rectangle 402 is shown to intersect only two sub-rectangles 307(4) and 307(5) of the parcel represented by the rectangle 302, three sub-rectangles 377(0), 377(1) and 377(2) of the parcel represented by the rectangle 372, one sub-rectangle 387(7) of the parcel represented by the rectangle 382, and one sub-rectangle 397(1) of the parcel represented by the rectangle 392. It is noted that with respect to the parcel represented by the rectangle 372, one of the sub-rectangles 377(0) that intersects the search rectangle 402 falls completely within the search rectangle. Then, using the bitmaps associated with each parcel, the segment data records within the four parcels that intersect the sub-rectangles that are partially within the search rectangle can be identified (i.e., 307(4), 307(5), 377(1), 377(2), 387(7), and 397(1)), the segment data records within the parcel that intersects the sub-rectangle that is wholly within the search rectangle can be readily identified (i.e., 377(0)), and the segment data records within the parcels that do not intersect the sub-rectangles that are partially or wholly within the search rectangle can be readily identified. This step may be performed by the third routine 553 in the interface layer 550. Only the segment records that are identified as intersecting the sub-rectangles that are partially or wholly within the search rectangle are de-compressed. Of these, the segment records that are identified as intersecting the sub-rectangle which is wholly within the search rectangle (i.e. 377(0), are not examined because these records are known to fall within the search rectangle and therefore meet the search criterion. Only the segment records that are identified as intersecting the sub-rectangles that are partially or wholly within the search rectangle need to be both de-compressed and examined because some of these records may not meet the search criterion of falling within the search rectangle 402. The segment records in the sub-rectangles of each of these four parcels are de-compressed and examined. The de-compression and examination can be performed by the fourth routine 554 in the interface layer 550. The segment records that represent features that intersect the search rectangle 402 are returned to the requesting routine in the navigation application 520.

As demonstrated by this example, the arrangement of data within the parcels and the indices associated with the arrangement enable a program to search the database for records very efficiently. In the example, of the 32 sub-rectangles included in the four parcels (i.e., four parcels with eight sub-rectangles per parcel), only the segment records in six of the sub-rectangles had to both de-compressed and examined to ascertain which of them fell within the search rectangle. The segment records in one of the sub-rectangles had to be de-compressed, but did not have to be examined since the sub-rectangle was determined to fall completely within the search rectangle. The segment records in the remaining 25 sub-rectangles did not have to be either de-compressed or examined. Avoiding de-compression or examination of these many records can result in significant improvement in performance.

Alternatives Although the embodiments described above refer to routing data segments, embodiments of the disclosed arrangement can be applied to other kinds of data, such as cartographic data, point of interest data, or any other kind of data that is spatially parcelized. Further, although the embodiments described above refer to using the internal kd-tree indices and bitmaps with bottom layer data, these features can be used with higher layers as well. In addition, although the embodiments disclose the internal kd-tree and bitmap associated with each parcel as being located in the parcel (e.g., physically close to the data in the parcel), the internal kd-tree and bitmap for each parcel may be located physically outside the parcel in another location in the database. For example, the internal kd-tree indices and bitmaps for each parcel may be located with the global kd-tree or among the index files (11 of FIGS. 4 and 5).

The advantages provided by the use of internal kd-tree indices and associated bitmap may benefit certain kinds of applications. For example, in certain navigation system platform implementations, the geographic database is located remotely from the navigation application program and data from the geographic database is transmitted via a communications link. This kind of navigation system would benefit from an embodiment of the present system because fewer fully decompressed records might need to be transmitted.

Another advantage provided by some of the disclosed embodiments is that the parcel size may be made larger. In some systems, a larger parcel size may be desired. If the parcel size used in a spatially organized geographic database were made larger, larger geographic areas could be represented by the data records in each parcel. Although this may provide performance enhancements for some kinds of navigating functions, other functions may suffer performance decreases because more data are being handled with each read access. The search rectangle function described in the above examples, in which the data records that represent features in a search rectangle, may be the kind of function whose performance is adversely affected by larger parcel sizes. The embodiments disclosed above help reduce the effect of larger parcels sizes for this kind of function, as well as other kinds of navigation functions.

It is intended that the foregoing detailed description be regarded as illustrative rather than limiting and that it is understood that the following claims including all equivalents are intended to define the scope of the invention.

We claim:

1. A computer-implemented method for producing a database that represents geographic features in a geographic region comprising the steps of:
    separating a plurality of data entities that represent the geographic features into a plurality of parcels,
        wherein each parcel of said plurality of parcels contains a separate subset of said plurality of data entities, and
        wherein the subset of said plurality of data entities contained in each parcel represents the geographic features located in a separate one of a plurality of areas into which the geographic region is divided;
        wherein an improvement comprises:
    for each parcel of said plurality of parcels,
        dividing the area associated therewith into a plurality of sub-areas; and
        storing a first index that identifies, for each of the data entities contained in the parcel, each of the sub-areas intersected by the geographic feature represented thereby,
    whereby each sub-area in which a geographic feature is located can be determined by using the first index.

2. The method of claim 1 wherein said first index is a bitmap.

3. The method of claim 1 wherein each of the plurality of sub-areas is rectangular.

4. The method of claim 1 wherein said first index is stored internally of the parcel associated therewith.

5. The method of claim 1 further comprising:
    with respect to each of said parcels, storing a second index identifying boundaries of each of said plurality of sub-areas.

6. The method of claim 5 wherein said second index is a kd-tree index.

7. The method of claim 5 wherein said second index is stored internally of said parcel.

8. The method of claim 1 wherein with respect to each parcel, the data entities that represent geographic features encompassed by each of said plurality of sub-areas are approximately equal in number to the data entities that represent geographic features encompassed by each of the other of the plurality of sub-areas.

9. The method of claim 1 wherein the data entities represent segments of roads in the geographic region.

10. The method of claim 1 wherein the step of dividing forms eight sub-areas.

11. A computer-implemented method of using a geographic database comprising the steps of:
   accepting specification of a search area in a geographic region represented by the geographic database;
   identifying a parcel of data in the geographic database, wherein the parcel contains data entities that represent geographic features encompassed within a first rectangular area located within the geographic region, wherein the first rectangular area intersects said search area;
   wherein an improvement comprises:
   using a first index associated with the parcel to identify which of a plurality of rectangular sub-areas into which the first rectangular area is divided intersect the search area; and
   using a second index associated with the parcel to identify the data entities contained in the parcel that intersect each of the plurality of rectangular sub-areas identified as intersecting the search area,
   wherein in the case that the search area intersects more than one of said plurality of rectangular sub-areas and a geographic feature represented by a single data entity intersects each of said more than one of said plurality of rectangular sub-areas, the second index identifies said single data entity,
   whereby the data entities that represent the geographic features located within the search area are determined.

12. A computer-implemented method of using a geographic database to identify geographic features located within a search area, wherein the geographic database contains data entities that represent geographic features located in a geographic region, and wherein the geographic database is organized into parcels, each of which contains a subset of all the data entities in the geographic database, and wherein the subset of data entities in each parcel represent the geographic features encompassed within a separate respective one of a plurality of rectangular areas into which the geographic region is divided, wherein the method comprises the steps of:
   (a) identifying each parcel that is associated with a rectangular area that intersects the search area;
   wherein an improvement comprises:
   (b) for each parcel identified in step (a), using a first index associated with the parcel to identify each rectangular sub-area formed of the rectangular area associated with the parcel that intersects the search area; and
   (c) for each parcel identified in step (a), using a second index associated with the parcel to identify each of the data entities contained therein that represents a geographic feature that intersects each of the sub-areas identified in step (b),
   wherein in the case that the search area intersects more than one of said plurality of rectangular sub-areas and a geographic feature represented by a single data entity intersects each of said more than one of said plurality of rectangular sub-areas, the second index identifies said single data entity,
   whereby the data entities identified in step (c) represent geographic features located in the search area.

13. The method of claim 12 wherein said data entities represent segments of roads.

14. The method of claim 12 wherein the first index is a kd-tree index.

15. The method of claim 12 wherein the second index is a bitmap.

16. In a geographic database comprised of data records and stored on a computer-readable medium, wherein each data record represents a physical geographic feature in a geographic region,
   wherein the data records are separated into a plurality of parcels,
   wherein each parcel contains a separate portion of the data records, such that the portion of data records contained in each parcel represents those geographic features encompassed together in a separate respective one of a plurality of areas formed by dividing the geographic region,
   wherein the improvement comprises:
   a plurality of index tables of a first type, each of which is associated with a separate one of said plurality of parcels and wherein each of said index tables of the first type comprises:
      a separate reference to each data record in the parcel to which said index table is associated; and
      a reference to at least one of a plurality of groupings of the plurality of data records in the parcel,
   wherein the plurality of groupings are based upon a division of the area associated with the parcel into a plurality of smaller sub-areas.

17. The invention of claim 16 further comprising:
   a plurality of index tables of a second type, each of which is associated with a separate respective one of said plurality of parcels, wherein each of said index tables of the second type comprises:
      a reference to each of a plurality of separate sub-areas into which the area associated with the respective parcel is divided.

18. The invention of claim 16 wherein the sub-areas associated with each parcel are spatially organized.

19. The invention of claim 16 wherein said data records represent segments of roads.

20. A computer usable medium having computer readable data structure means embodied thereon, wherein the computer readable data structure means is used for a database for geographic data comprised of data records that represent segments of roads located in a geographic region, said computer readable data structure comprising:
   a plurality of parcels, each of which contains a separate portion of the data records, such that each parcel contains the data records that represent the segments of roads located in a separate one of a plurality of areas into which the geographic region is divided;
   wherein an improvement comprises:
   a plurality of first indexes, each of which is associated with a respective one of the plurality of parcels, wherein each first index defines a plurality of sub-areas formed of the area associated with the parcel associated therewith; and a plurality of second indexes, each of which is associated with a respective one of the plurality of parcels, wherein each second index associates each of the data records in the parcel associated therewith to at least one of the plurality of sub-areas defined by the first index associated with the parcel, wherein in the case where a geographic feature represented by a single data entity intersects more than one of said plurality of rectangular sub-areas, the second index identifies said single data entity, whereby the computer readable data structure means identifies which of the data records represent segments of roads located in any specified sub-area of any specified area.

21. The invention of claim 20 wherein the data records associated with each sub-area are approximately similar in number to each other.

* * * * *